United States Patent
Soundararajan et al.

(10) Patent No.: US 11,403,674 B2
(45) Date of Patent: *Aug. 2, 2022

(54) SYSTEMS AND METHODS FOR CAPTURING TIME SERIES DATASET OVER TIME THAT INCLUDES SECURED REPRESENTATIONS OF DISTRIBUTED LEDGER ADDRESSES

(71) Applicant: Hewlett Packard Enterprise Development LP, Houston, TX (US)

(72) Inventors: Abilash Soundararajan, Bangalore (IN); Michael Reid Tennefoss, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 44 days.

This patent is subject to a terminal disclaimer.

(21) Appl. No.: 16/049,746

(22) Filed: Jul. 30, 2018

(65) Prior Publication Data

US 2020/0034888 A1 Jan. 30, 2020

(51) Int. Cl.
*G06Q 30/02* (2012.01)
*H04L 9/06* (2006.01)
(Continued)

(52) U.S. Cl.
CPC ....... *G06Q 30/0272* (2013.01); *G06Q 20/065* (2013.01); *G06Q 40/08* (2013.01); *H04L 9/0637* (2013.01); *H04N 7/181* (2013.01)

(58) Field of Classification Search
CPC .. G06Q 30/0272; G06Q 20/065; G06Q 40/08; H04L 9/0637; H04N 7/181
See application file for complete search history.

(56) References Cited

U.S. PATENT DOCUMENTS 6,101,604 A 8/2000 Barton
6,963,363 B1 11/2005 Ohmura
(Continued)

FOREIGN PATENT DOCUMENTS

CN 106059747 A 10/2016
CN 107154852 A 9/2017
(Continued)

OTHER PUBLICATIONS

Photograph Ownership and Authorization using Blockchain, Poudel et al., 2019 Artificial Intelligence for Transforming Business and Society (AITB).*

(Continued)

*Primary Examiner* — David J Stoltenberg
(74) *Attorney, Agent, or Firm* — Sheppard Mullin Richter & Hampton LLP

(57) ABSTRACT

Implementations of the disclosure are directed to capturing a time series of distributed ledger identities of entities and/or locations over time. In implementations, a method includes: capturing, at a device, a time series dataset, the time series dataset including: for each time of a plurality of times, a secured representation of a distributed ledger address in a beacon received by the device; using the device to make the time series dataset available to a distributed ledger network for verification; and receiving, at the device, confirmation from the distributed ledger network that the time series dataset was verified.

20 Claims, 13 Drawing Sheets

(51) Int. Cl.
*H04N 7/18* (2006.01)
*G06Q 40/08* (2012.01)
*G06Q 20/06* (2012.01)

(56) References Cited

U.S. PATENT DOCUMENTS

| | | | |
|---|---|---|---|
| 7,518,502 B2 | 4/2009 | Austin et al. |
| 7,777,629 B2 | 8/2010 | Lee et al. |
| 8,149,090 B2 | 4/2012 | Hall et al. |
| 8,258,926 B2 | 9/2012 | Bayer et al. |
| 9,253,433 B2 | 2/2016 | Boss et al. |
| 9,324,091 B2 | 4/2016 | Randell et al. |
| 9,375,628 B2 | 6/2016 | DeAngelis et al. |
| 9,406,010 B2 | 8/2016 | Rujan et al. |
| 9,635,000 B1 | 4/2017 | Muftic |
| 9,672,710 B2 | 6/2017 | Nassar et al. |
| 9,714,099 B2 | 7/2017 | Dinkelmann et al. |
| 9,817,113 B2 | 11/2017 | Loftis et al. |
| 9,818,141 B2 | 11/2017 | Abuelsaad et al. |
| 9,881,216 B2 | 1/2018 | Buehler et al. |
| 9,898,782 B1 | 2/2018 | Winklevoss et al. |
| 9,980,137 B2 | 5/2018 | South et al. |
| 10,121,025 B1* | 11/2018 | Rice ................ G06F 21/645 |
| 10,305,833 B1 | 5/2019 | Dennis |
| 10,339,523 B2 | 7/2019 | McDonough et al. |
| 10,361,866 B1* | 7/2019 | McGregor ............ H04L 9/321 |
| 10,375,050 B2* | 8/2019 | Lyons ................. H04L 63/123 |
| 10,424,189 B2 | 9/2019 | Daoura et al. |
| 10,579,974 B1 | 3/2020 | Reed |
| 10,580,281 B2 | 3/2020 | Daoura et al. |
| 10,581,847 B1 | 3/2020 | Sun et al. |
| 10,594,689 B1* | 3/2020 | Weaver ................. H04L 9/3239 |
| 10,614,646 B1 | 4/2020 | Douglass et al. |
| 10,652,018 B2 | 5/2020 | Smith et al. |
| 10,660,059 B1 | 5/2020 | Knas et al. |
| 10,755,226 B1 | 8/2020 | Robyak et al. |
| 10,757,672 B1 | 8/2020 | Knas et al. |
| 10,762,311 B2 | 9/2020 | Lemsitzer et al. |
| 10,778,438 B2 | 9/2020 | Shi et al. |
| 10,788,229 B2 | 9/2020 | Sinha et al. |
| 10,819,504 B2 | 10/2020 | Shi et al. |
| 10,825,324 B2 | 11/2020 | Haviv et al. |
| 10,826,684 B1 | 11/2020 | Winter et al. |
| 10,826,703 B1* | 11/2020 | Shipley .................. H04L 63/10 |
| 10,833,843 B1 | 11/2020 | Vijayvergia et al. |
| 10,872,215 B2 | 12/2020 | Vancorenland et al. |
| 10,878,522 B2 | 12/2020 | Blackman et al. |
| 10,885,336 B1 | 1/2021 | Davis et al. |
| 10,917,744 B2 | 2/2021 | Brice et al. |
| 10,979,862 B2 | 4/2021 | Daoura et al. |
| 11,115,782 B2 | 9/2021 | Geiger et al. |
| 2005/0134459 A1 | 6/2005 | Glick et al. |
| 2006/0250231 A1 | 11/2006 | Wang et al. |
| 2008/0030345 A1 | 2/2008 | Austin et al. |
| 2008/0141027 A1 | 6/2008 | Kim et al. |
| 2010/0039284 A1 | 2/2010 | Hall et al. |
| 2013/0166455 A1 | 6/2013 | Feigelson |
| 2014/0040135 A1 | 2/2014 | Ovick et al. |
| 2014/0337232 A1 | 11/2014 | Glasgo |
| 2015/0269384 A1* | 9/2015 | Holman ................. G06Q 30/00 726/26 |
| 2015/0269624 A1 | 9/2015 | Cheng et al. |
| 2015/0302409 A1 | 10/2015 | Malek et al. |
| 2016/0012465 A1 | 1/2016 | Sharp |
| 2016/0098723 A1* | 4/2016 | Feeney ................. G06Q 20/065 705/75 |
| 2016/0203522 A1 | 7/2016 | Shiffert et al. |
| 2016/0275461 A1 | 9/2016 | Sprague et al. |
| 2016/0292672 A1 | 10/2016 | Fay et al. |
| 2016/0321435 A1* | 11/2016 | McCoy ................. G06Q 50/01 |
| 2016/0321675 A1* | 11/2016 | McCoy ................. G06Q 30/018 |
| 2016/0328713 A1 | 11/2016 | Ebrahimi |
| 2016/0330027 A1 | 11/2016 | Ebrahimi |
| 2016/0330034 A1 | 11/2016 | Back et al. |
| 2016/0379213 A1 | 12/2016 | Isaacson et al. |
| 2017/0017955 A1 | 1/2017 | Stern et al. |
| 2017/0041328 A1* | 2/2017 | Stack ................ G06F 21/645 |
| 2017/0046526 A1 | 2/2017 | Chan et al. |
| 2017/0046689 A1 | 2/2017 | Lohe et al. |
| 2017/0046694 A1* | 2/2017 | Chow ................ H04L 63/061 |
| 2017/0046709 A1 | 2/2017 | Lee et al. |
| 2017/0048216 A1* | 2/2017 | Chow ................ H04L 63/0876 |
| 2017/0069153 A1 | 3/2017 | Teicher |
| 2017/0083907 A1 | 3/2017 | McDonough et al. |
| 2017/0093700 A1 | 3/2017 | Gilley et al. |
| 2017/0214522 A1* | 7/2017 | Code ................ G06Q 20/3672 |
| 2017/0215038 A1 | 7/2017 | Primm et al. |
| 2017/0230791 A1 | 8/2017 | Jones |
| 2017/0232300 A1* | 8/2017 | Tran ................ G06F 3/017 434/247 |
| 2017/0236350 A1 | 8/2017 | Lin |
| 2017/0242935 A1 | 8/2017 | Wragg et al. |
| 2017/0243193 A1 | 8/2017 | Manian et al. |
| 2017/0243208 A1 | 8/2017 | Kurian et al. |
| 2017/0262862 A1* | 9/2017 | Aljawhari ......... G06F 16/90335 |
| 2017/0316390 A1 | 11/2017 | Smith et al. |
| 2017/0317997 A1 | 11/2017 | Smith et al. |
| 2017/0330174 A1 | 11/2017 | Demarinis et al. |
| 2017/0344988 A1 | 11/2017 | Cusden et al. |
| 2017/0364900 A1 | 12/2017 | Hudson et al. |
| 2018/0025166 A1 | 1/2018 | Daniel et al. |
| 2018/0048474 A1* | 2/2018 | Landrock ................ G06F 21/44 |
| 2018/0078843 A1 | 3/2018 | Tran et al. |
| 2018/0082294 A1 | 3/2018 | Davis et al. |
| 2018/0107914 A1 | 4/2018 | Ziola |
| 2018/0117446 A1 | 5/2018 | Tran et al. |
| 2018/0137512 A1 | 5/2018 | Georgiadis et al. |
| 2018/0144292 A1 | 5/2018 | Mattingly et al. |
| 2018/0144634 A1 | 5/2018 | Kim et al. |
| 2018/0145836 A1 | 5/2018 | Saur et al. |
| 2018/0167198 A1 | 6/2018 | Muller et al. |
| 2018/0176228 A1 | 6/2018 | He et al. |
| 2018/0189528 A1 | 7/2018 | Hanis et al. |
| 2018/0191503 A1 | 7/2018 | Alwar et al. |
| 2018/0197159 A1* | 7/2018 | Sheerin ............. G06Q 20/3829 |
| 2018/0197173 A1 | 7/2018 | Durvasula et al. |
| 2018/0197186 A1* | 7/2018 | Sheerin ............. G06Q 20/065 |
| 2018/0205546 A1* | 7/2018 | Haque ................ H04L 9/3247 |
| 2018/0240086 A1 | 8/2018 | Sobotka |
| 2018/0270065 A1 | 9/2018 | Brown et al. |
| 2018/0284093 A1 | 10/2018 | Brown et al. |
| 2018/0316502 A1 | 11/2018 | Nadeau et al. |
| 2018/0341945 A1 | 11/2018 | Welborn et al. |
| 2018/0343238 A1* | 11/2018 | Tola ................ H04L 9/3263 |
| 2018/0343307 A1 | 11/2018 | Lotter et al. |
| 2018/0351949 A1* | 12/2018 | Scott ................ H04L 63/12 |
| 2018/0365633 A1 | 12/2018 | Hanis et al. |
| 2019/0012637 A1* | 1/2019 | Gillen ................ H04L 9/0819 |
| 2019/0019144 A1* | 1/2019 | Gillen ................ H04L 9/3297 |
| 2019/0034917 A1 | 1/2019 | Nolan et al. |
| 2019/0034923 A1 | 1/2019 | Greco et al. |
| 2019/0036887 A1 | 1/2019 | Miller |
| 2019/0036906 A1* | 1/2019 | Biyani ................ H04L 9/3297 |
| 2019/0068615 A1 | 2/2019 | Pack et al. |
| 2019/0080284 A1 | 3/2019 | Kim et al. |
| 2019/0080300 A1 | 3/2019 | Stojanovski |
| 2019/0087792 A1* | 3/2019 | Chow ................ G06Q 20/0655 |
| 2019/0102850 A1* | 4/2019 | Wheeler ............. G06Q 20/102 |
| 2019/0108362 A1* | 4/2019 | Miller ................ G06Q 20/382 |
| 2019/0122258 A1* | 4/2019 | Bramberger ........ G06Q 30/0248 |
| 2019/0165949 A1* | 5/2019 | Ramos ................ H04L 9/3239 |
| 2019/0172026 A1 | 6/2019 | Vessenes et al. |
| 2019/0180291 A1 | 6/2019 | Schmeling et al. |
| 2019/0188706 A1 | 6/2019 | McCurtis |
| 2019/0188708 A1 | 6/2019 | Shah |
| 2019/0207995 A1* | 7/2019 | Gonzales, Jr. ........ H04L 9/3247 |
| 2019/0213462 A1 | 7/2019 | McDonald et al. |
| 2019/0215162 A1 | 7/2019 | Dickenson et al. |
| 2019/0236214 A1* | 8/2019 | Kokernak ............. H04N 21/478 |
| 2019/0253256 A1* | 8/2019 | Saab ................ H04L 9/3239 |
| 2019/0253434 A1 | 8/2019 | Biyani et al. |
| 2019/0280875 A1 | 9/2019 | Ragnoni et al. |
| 2019/0289019 A1 | 9/2019 | Thekadath et al. |
| 2019/0294136 A1 | 9/2019 | Iacobone et al. |

(56) References Cited

U.S. PATENT DOCUMENTS

| | | | |
|---|---|---|---|
| 2019/0295162 A1* | 9/2019 | Wang | H04L 9/0866 |
| 2019/0302249 A1* | 10/2019 | High | G01S 5/0221 |
| 2019/0303463 A1* | 10/2019 | Catalano | G06F 16/22 |
| 2019/0303951 A1* | 10/2019 | Bakalis | G06K 7/1417 |
| 2019/0305967 A1 | 10/2019 | Hamel et al. | |
| 2019/0332838 A1 | 10/2019 | Vancorenland et al. | |
| 2019/0333057 A1 | 10/2019 | Miller | |
| 2019/0334698 A1* | 10/2019 | Singh | G06Q 20/10 |
| 2019/0340269 A1 | 11/2019 | Biernat et al. | |
| 2019/0340584 A1 | 11/2019 | Arora et al. | |
| 2019/0349190 A1* | 11/2019 | Smith | H04L 69/18 |
| 2019/0349426 A1 | 11/2019 | Smith et al. | |
| 2019/0354943 A1* | 11/2019 | Mulye | H04N 21/2407 |
| 2019/0361917 A1 | 11/2019 | Tran et al. | |
| 2019/0366475 A1 | 12/2019 | Scarselli et al. | |
| 2019/0370286 A1* | 12/2019 | Bertsch | G06F 16/7867 |
| 2019/0372769 A1* | 12/2019 | Fisher | H04L 9/3247 |
| 2019/0372773 A1* | 12/2019 | Bertsch | H04L 9/3236 |
| 2019/0378142 A1* | 12/2019 | Darnell | G06F 21/645 |
| 2019/0386822 A1* | 12/2019 | Ben-Simon | H04L 9/088 |
| 2019/0391972 A1* | 12/2019 | Bates | H04W 12/06 |
| 2020/0005398 A1 | 1/2020 | Castinado et al. | |
| 2020/0007331 A1 | 1/2020 | Wentz | |
| 2020/0012806 A1* | 1/2020 | Bates | G06F 21/64 |
| 2020/0013026 A1 | 1/2020 | Noonan et al. | |
| 2020/0034836 A1 | 1/2020 | Shah | |
| 2020/0034839 A1* | 1/2020 | Soundararajan | H04L 9/3239 |
| 2020/0034876 A1* | 1/2020 | Soundararajan | G06Q 30/0261 |
| 2020/0034888 A1* | 1/2020 | Soundararajan | G06Q 30/0272 |
| 2020/0034945 A1* | 1/2020 | Soundararajan | G06F 21/64 |
| 2020/0036533 A1* | 1/2020 | Soundararajan | H04L 9/3239 |
| 2020/0036712 A1* | 1/2020 | Soundararajan | H04L 63/0884 |
| 2020/0037158 A1* | 1/2020 | Soundararajan | H04L 9/3239 |
| 2020/0045020 A1* | 2/2020 | Soundararajan | H04L 9/006 |
| 2020/0050494 A1 | 2/2020 | Bartfai-Walcott et al. | |
| 2020/0051232 A1* | 2/2020 | McGregor | H04L 9/3239 |
| 2020/0076610 A1* | 3/2020 | Wang | H04L 9/0637 |
| 2020/0092102 A1* | 3/2020 | Wang | H04W 12/06 |
| 2020/0101367 A1* | 4/2020 | Tran | G06F 3/011 |
| 2020/0118094 A1 | 4/2020 | Haldenby et al. | |
| 2020/0119925 A1* | 4/2020 | Wang | G06Q 20/3827 |
| 2020/0134861 A1* | 4/2020 | Zucker | G06K 9/00771 |
| 2020/0143405 A1* | 5/2020 | Tucker | G06Q 20/384 |
| 2020/0151401 A1 | 5/2020 | Dyche et al. | |
| 2020/0155944 A1* | 5/2020 | Witchey | G06F 16/2379 |
| 2020/0177377 A1 | 6/2020 | Smith et al. | |
| 2020/0184291 A1 | 6/2020 | Tisdel | |
| 2020/0192885 A1 | 6/2020 | Grandau | |
| 2020/0234386 A1 | 7/2020 | Blackman et al. | |
| 2020/0265124 A1* | 8/2020 | Li | G06F 21/64 |
| 2020/0265356 A1 | 8/2020 | Lee et al. | |
| 2020/0265446 A1 | 8/2020 | Vargas | |
| 2020/0280454 A1 | 9/2020 | Finlow-Bates | |
| 2020/0294128 A1 | 9/2020 | Cella | |
| 2020/0311646 A1 | 10/2020 | Koenig et al. | |
| 2020/0311718 A1 | 10/2020 | Verdian et al. | |
| 2020/0402062 A1 | 12/2020 | Shi et al. | |
| 2021/0089514 A1 | 3/2021 | Werner et al. | |
| 2021/0091960 A1 | 3/2021 | Werner et al. | |
| 2021/0092613 A1 | 3/2021 | Palyutina et al. | |
| 2021/0097893 A1 | 4/2021 | Klappert et al. | |
| 2021/0117970 A1 | 4/2021 | Hugh et al. | |
| 2021/0192441 A1 | 6/2021 | Zhang | |
| 2021/0224727 A1 | 7/2021 | Rakhunde et al. | |
| 2021/0248338 A1 | 8/2021 | Spivack et al. | |
| 2021/0304200 A1 | 9/2021 | Doney et al. | |

FOREIGN PATENT DOCUMENTS

| | | | | |
|---|---|---|---|---|
| CN | 107392770 A | | 11/2017 | |
| CN | 107730188 A | | 2/2018 | |
| CN | ON 111213139 A | * | 5/2020 | G06F 16/27 |
| EP | 3249599 | | 11/2017 | |
| JP | 2018-173692 A | * | 11/2018 | G06F 21/64 |
| KR | 20180030971 A | | 3/2018 | |
| WO | WO2016189488 A2 | | 12/2016 | |
| WO | WO-2017027648 | | 2/2017 | |
| WO | WO2017165909 A1 | | 10/2017 | |
| WO | WO 2019/108168 A1 | * | 6/2019 | H04N 5/913 |
| WO | WO 2019/199288 A1 | * | 10/2019 | G06F 21/78 |
| WO | WO 2019/217531 A1 | * | 11/2019 | G06F 3/0354 |

OTHER PUBLICATIONS

Authentication of JPEG Images on the Blockchain, Dobre et al., 2018 International Conference on Control, Artificial Intelligence, Robotics & Optimization (ICCAIRO).*

A Technical Overview of the XYO Network, Blockchain's Cryptographic Location Oracle Network, Retrieved on Jun. 7, 2018, 27 Pgs. https://medium.com/xyonetwork/whitepaper-b4793efe7609.

Axon, L. et al., "PB-PKI: a Privacy-Aware Blockchain-Based PKI," 2016, 8 pages, https://ora.ox.ac.uk/objects/uuid:8bd33c4f-5614-400e-b958-48e53fe1b342/download_file?file_format=application/pdf&safe_filename=SECRYPT_2017.pdf&type_of_work=Conference%20item.

Blockchain Meets Database: Replace or Combine?, (Research Paper), Aug. 29, 2017, 5 Pgs.

Blockchain will work in trucking—but only if these three things happen, Mar. 3, 2018, 9 Pgs. https://techcrunch.com/2018/03/02/blockchain-will-work-in-trucking-but-only-if-these-three-things-happen/.

Bocek et al., Blockchains Everywhere—a Use-case of Blockchains in the Pharma Supply-chain, IFIP, May 8-12, 2017, 6 Pgs.

Bojja, S. et al., "Dandelion: Redesigning the Bitcoin Network for Anonymity," Jun. 2017, 34 pages, https://dl.acm.org/citation.cfm?id=3084459.

Expert Market US, "What is a Point of Sale System?" retrieved online Jun. 19, 2018, 8 pages, https://www.expertmarket.com/pos/what-is-a-point-of-sale-system.

Github, "Blockchain Based Anonymous Distributed ID System," retrieved online Jun. 19, 2018, 13 pages, https://github.com/arnaucode/darkID-prototype.

Gray, M., Enterprise Smart Contracts, (Research Paper), Retrieved Jun. 25, 2018, 21 Pgs.

Hardjono, T. et al., "Anonymous Identities for Permissioned Blockchains," Jan. 20, 2016, 20 pages, http://connection.mit.edu/wp-content/uploads/sites/29/2014/12/Anonymous-Identities-for-Permissioned-Blockchains2.pdf.

Heijden, R.W.V.D. et al., Blackchain: Scalability for Resource-constrained Accountable Vehicle-to-x Communication, (Research Paper), Dec. 11-15, 2017, 5 Pgs.

Laneaxis ICO (axis Token): Blockchain Trucking & Freight Shipping Coin?, Retrieved Jun. 15, 2018, 3 Pgs.

Liu, W. et al., "Advanced Block-chain Architecture for E-health Systems," Oct. 12-15, 2017, https://ieeexplore.ieee.org/document/8210847/.

Mathies, D., How a Blockchain-based Digital Photo Notary is Fighting Fraud and Fake News, Digital Trends, Jan. 25, 2018, 11 Pgs.

Matthews, Alice, RFID inventory provides real time monitoring for retailers, Dec. 1, 2017, 4 Pgs.

Modum Ensuring Compliance & Improving Efficiency in the Pharma Supply Chain, Modum.io AG, Aug. 8, 2017, 9 Pgs.

On Zero-knowledge Proofs in Blockchains, (Web Page), Retrieved Jun. 26, 2018, 7 Pgs., https://medium.com/@argongroup/on-zero-knowledge-proofs-in-blockchains-14c48cfd1dd1.

Orenge, A., "Blockchain-based Provenance Solution for Handcrafted Jewellery," 2018, 72 pages, https://comserv.cs.ut.ee/home/files/THESIS_+Blockchain-based+Provenance+Solution+for+Handcrafted+Jewellery+-+Antony-Orenge.pdf?study=ATILoputoo&reference=FF850BE046C89CBDC66A2F372421A77120C7D340.

Park et al., Blockchain Security in Cloud Computing: Use Cases, Challenges, and Solutions, Symmetry 2017, 13 Pgs. http://www.mdpi.com/2073-8994/9/8/164/pdf.

(56) References Cited

OTHER PUBLICATIONS

Ramachandran A. et al., "Using Blockchain and Smart Contracts for Secure Data Provenance Management," Sep. 28, 2017, 11 pages, https://arxiv.org/pdf/1709.10000.pdf.

Shyft: Whitepaper, (Research Paper), 2018, 25 Pgs.

Sovrin Foundation, Sovrin™: A Protocol and Token for SelfSovereign Identity and Decentralized Trust, Jan. 2018, 42 pages, https://sovrin.org/wp-content/uploads/Sovrin-Protocol-and-Token-White-Paper.pdf.

Victoria L. Lemieux, "Blockchain and Distributed Ledgers as Trusted Record keeping Systems: An Archival Theoretic Evaluation Framework", Future Technologies Conference (FTC) 2017, pp. 1-15.

Zhang et al., "Town Crier: An Authenticated Data Feed for Smart Contracts," ACM'16, Oct. 2016, 20 pages.

Xu et al., "A Taxonomy of Blockchain-Based Systems for Architecture Design", IEEE, 2017, 10 pages.

\* cited by examiner 1000-1

| TIME | Captured Data |
|---|---|
| T1 | TOTA-A1(B1, T1), TOTA-L1(B2, T1), TOTA-P1(B3, T1), IMAGE(T1) |
| T2 | TOTA-A1(B1, T2), TOTA-L2(B4, T2), TOTA-P1(B3, T2), IMAGE(T2) |
| ... | ... |
| TN | TOTA-A1(B1, TN), TOTA-LN(B5, TN), TOTA-P1(B3,TN), IMAGE(TN) |

1000-2

| TIME | Captured Data |
|---|---|
| T1 | TOTA-A1(B1, T1), TOTA-A2(B4, T1) TOTA-L1(B2, T1), TOTA-P1(B3, T1), IMAGE(T1) |
| T2 | TOTA-A1(B1, T2), TOTA-A2(B4, T2), TOTA-L1(B2, T2), TOTA-P1(B3, T2), IMAGE(T2) |
| ... | ... |
| TN | TOTA-A2(B4, TN), TOTA-L1(B2, TN), TOTA-P1(B3,TN), IMAGE(TN) |

1000-3

| TIME | Captured Data |
|---|---|
| T1 | TOTA-A1(B1, T1), TOTA-L1(B2, T1), TOTA-P1(B3, T1), IMAGE(T1) |
| T2 | TOTA-A1(B1, T2), TOTA-L2(B4, T2), TOTA-P1(B3, T2), IMAGE(T2) |
| ... | ... |
| TN | TOTA-A1(B1, TN), TOTA-LN(B5, TN), TOTA-P2(B6,TN), IMAGE(TN) |

FIG. 10

SYSTEMS AND METHODS FOR CAPTURING TIME SERIES DATASET OVER TIME THAT INCLUDES SECURED REPRESENTATIONS OF DISTRIBUTED LEDGER ADDRESSES

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments.

FIG. 10 illustrates three different examples of time series including images and secured representations of blockchain addresses that may be captured by a client device, in accordance with implementations of the disclosure.

Figure 1:
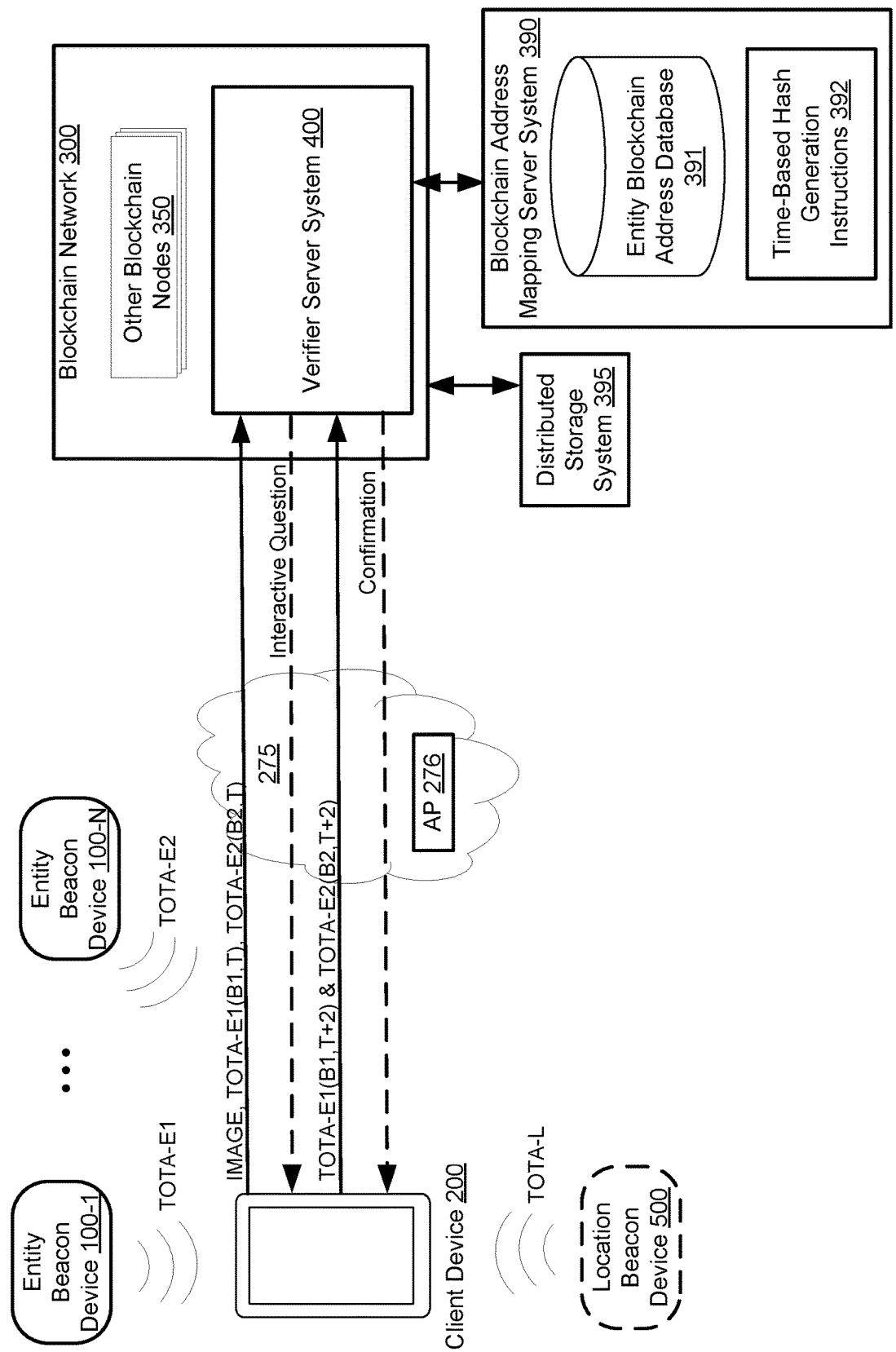
FIG. 1 is a diagram illustrating an example environment that uses entity beacon devices and a blockchain network including a verifier server system ("verifier") to capture verifiable images having an embedded immutable identity of things appearing in the image, in accordance with implementations of the disclosure.

The figures are not intended to be exhaustive or to limit various embodiments to the precise form disclosed.

DETAILED DESCRIPTION

As used herein, the term "distributed ledger" generally refers to a shared digital ledger that is decentralized and shared between nodes distributed across a network. After a transaction that is approved to be written to the ledger is consented by at least the majority of the nodes, the contents of the ledger are synchronized across all the nodes. Different types of consensus mechanisms that bring in varying levels of processing requirements to agree on a transaction amongst distributed nodes may be utilized in a distributed ledger network. Examples of common consensus mechanisms include proof of work, proof of stake, proof of elapsed time, Kafka, etc. Various platforms have adopted different consensus mechanisms.

Distributed ledger technology (DLT) describes the superset of the different variations of this technology. One presently popular type of DLT is blockchain technology. While in a distributed ledger a transaction is written to the ledger after consensus, the requirement is more specific in a blockchain: transactions are aggregated in to a block and the block is appended to the last block of an existing linear chain of blocks. As such, all blockchains are a form of a distributed ledger, but all distributed ledgers are not necessarily a blockchain. BITCOIN and ETHEREUM are examples of blockchain-based platforms. Directed acyclic graphs (DAG) are another example of a common form of DLT. IOTA is an example of a DAG-based platform. HYPERLEDGER is an example of a DLT-based platform. Unless explicitly stated otherwise, implementations of the disclosure may apply to any variant of DLT, including blockchains, DAGs, etc.

Although embodiments of the disclosure will be primarily described in the context of blockchains, it should be appreciated that all embodiments, unless expressly stated otherwise, may be applied to other variants of distributed ledger technology. For example, to the extent an embodiment is described in the context of a blockchain network sharing a blockchain, it should be appreciated that the embodiment may more generally be applied in a distributed ledger network sharing a distributed ledger. Similarly, to the extent that an embodiment recites a "blockchain address," a "secured representation of a blockchain address," "a blockchain application," or "a blockchain transaction," it should be appreciated that the embodiment may more generally be applied using a "distributed ledger address," "a secured representation of a distributed ledger address," "a distributed ledger application," and/or "a distributed ledger transaction."

As used herein, the term "public blockchain" generally refers to a blockchain that is accessible to any entity and whereby any entity may participate in the consensus process. A public blockchain may be referred to as a "fully decentralized" blockchain.

As used herein, the term "private blockchain" generally refers to a blockchain where a limited set of trusted entities participate in a blockchain network. A permissioned set of trusted nodes may participate in the consensus process. For example, a consortium of multiple financial institutions may form a private blockchain network. The right to read a private blockchain may be public or restricted to trusted nodes. A private blockchain may be referred to as a permissioned blockchain. Although implementations of the disclosure will primarily be described in the context of private blockchains that are implemented by consortiums, it should be appreciated that the technology disclosed herein may be adapted for use in anything from public to private blockchains.

As used herein, the term "blockchain address" refers to an identifier for a receiver or a sender in a blockchain transaction. A unique blockchain address may be associated with a person, an animal, a corporation, a location, an asset, or some other thing.

As used herein, the terms "off-chain" and "off-chain transaction" refer to transactions that do not occur within a blockchain.

As used herein, the term "smart contract" refers to self-executing code residing on a blockchain network, which automates execution of contracts between trusted parties based on events on a blockchain or distributed ledger.

As used herein, the term "blockchain wallet" refers to a digital wallet that helps manage a user's blockchain account (s), including private and public keys associated with the identity owning the wallet. For example, in particular implementations, a blockchain wallet may be to manage cryptocurrency accounts.

As used herein, the term "secured representation of a blockchain address" generally refers to a value (e.g., a number in decimal format, hexadecimal format, etc.) that is generated by applying a time-based cryptographic hashing algorithm to a blockchain address.

As used herein, the terms "time-based one-time advertisement" and "TOTA" generally refer to a message including a one-time value generated by applying a cryptographic hash function using a blockchain address and a current timestamp. The generated one-time value may be referred to as an example of a "secured representation of a blockchain address." The TOTA may only be valid for a short period of time and only for one time usage. This short duration may be configured by a network administrator based on business requirement(s). The reason for limited usage of the advertisement may be to ensure that repeated usage of the advertisement is not nefariously done by people who have moved away from the location but want to use the same advertisement as their proof of being there.

As used herein, the term "fixed advertisement" generally refers to a printout or other display of a secured representation of a blockchain address that does not change over time. For example, a fixed advertisement may comprise a printed or electronic code such as a QR or passive RFID code that embeds a secured representation of a blockchain address that does not change over time. As fixed advertisements do not change over time, a fixed relationship between the secured representations of the blockchain addresses of the fixed advertisement and their respective clear versions may be maintained in a database table or other suitable data structure. The data structure may be referred to during verification to determine a clear version of a blockchain address corresponding to a fixed advertisement.

As used herein, the terms "interactive proving mechanism" and "interactive proving protocol" refer to a process whereby a verifier (e.g., a server system operating on a blockchain network) asks a prover (e.g., a client device) to answer one or more questions that require the prover to capture one or more secured representations of blockchain addresses. For example, an interactive proving mechanism may be performed to prove that an individual (e.g., an individual carrying a client device) is at a particular location at a particular time. As another example, an interactive proving mechanism may be performed to prove that an individual (e.g., an individual carrying a client device) has custody of an asset at a particular location and time. Every iteration of questioning after a first round of receiving data from the prover may prove the validity of a claim with higher confidence. In some cases, just the first round of questioning may be needed. The number of iterations and types of questions that are asked may vary depending upon the business application.

As used herein, the term "distributed attestation" generally refers to a verifiable claim that is written to a blockchain. For example, a distributed attestation may be a verifiable claim that attests to the presence of an entity at a particular location and time, a verifiable claim that attests to the custody of an asset by a user at a particular location and time, or some other verifiable claim. A distributed attestation may be reusable to verify a claim to various entities. A distributed attestation may include a secured representation of a blockchain address of an entity associated with a claim and/or a secured representation of a blockchain address of a location associated with a claim. A permissioned entity may be configured to verify the claim by determining clear versions of the secured representations of the blockchain addresses.

As used herein, the term "centralized identity" generally refers to an identity of an entity that is created off-chain and maintained by a centralized entity. For example, a centralized identity may refer to a username maintained on an active directory service, an email address associated with a domain, etc.

Method and system to capture verifiable pictures with embedded immutable identity of things based on Blockchain and other Distributed Ledger Technologies Presently, some systems are limited in their ability to guarantee that an image is unmodified, and that tags of objects, persons, or other entities appearing in the image provide a true identity of the object, person, or entity that they are identifying. Implementations described herein are directed to obtaining verifiable images having an embedded immutable identity of things appearing in the image. Although implementations described herein will primarily be described in the context of images captured as a photograph or video using a camera, it should be appreciated that the techniques described herein may be extended to other types of captured or obtained images, including a radiograph image, a thermal image, a radar pattern image, or any other digital reproduction or digital representation of a person, place, or thing.

Figure 3:
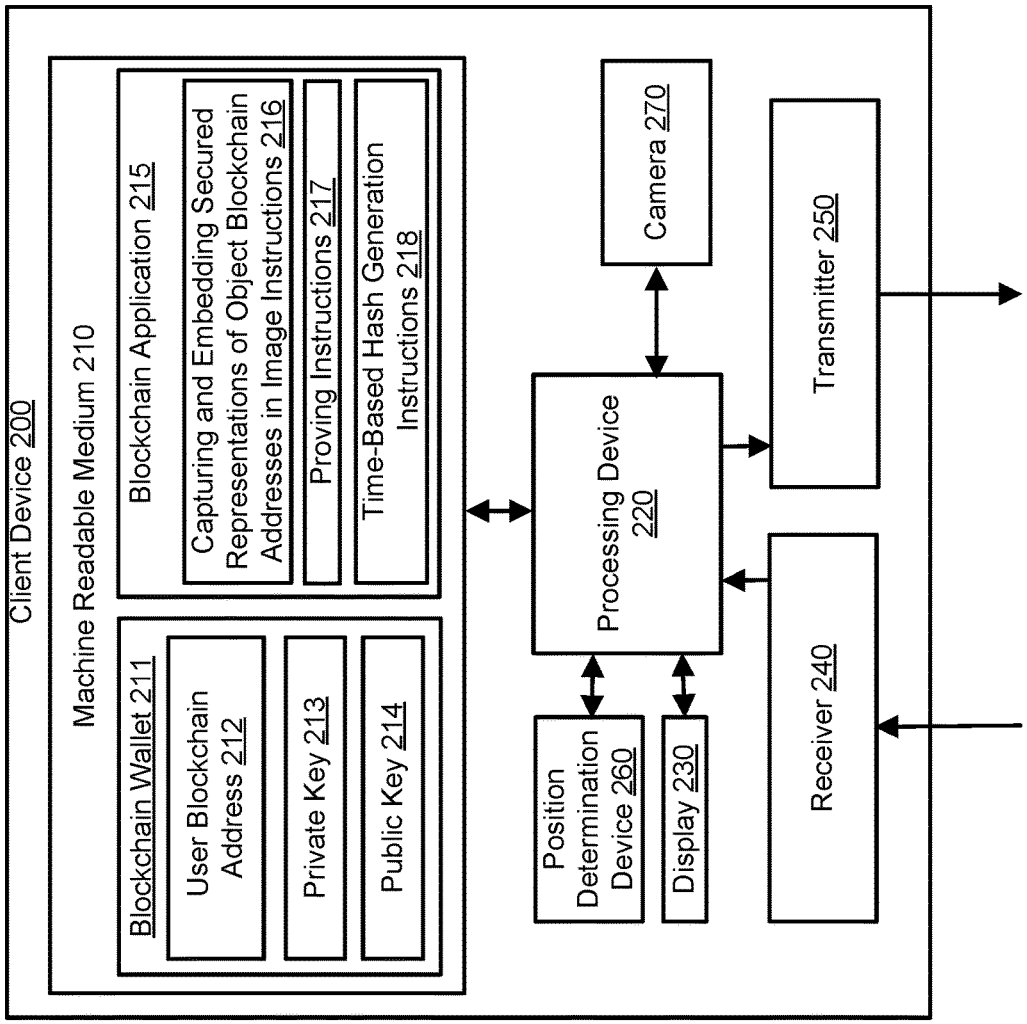
FIG. 3 is a block diagram illustrating an example architecture of components of a client device, in accordance with implementations of the disclosure.
Figure 2:
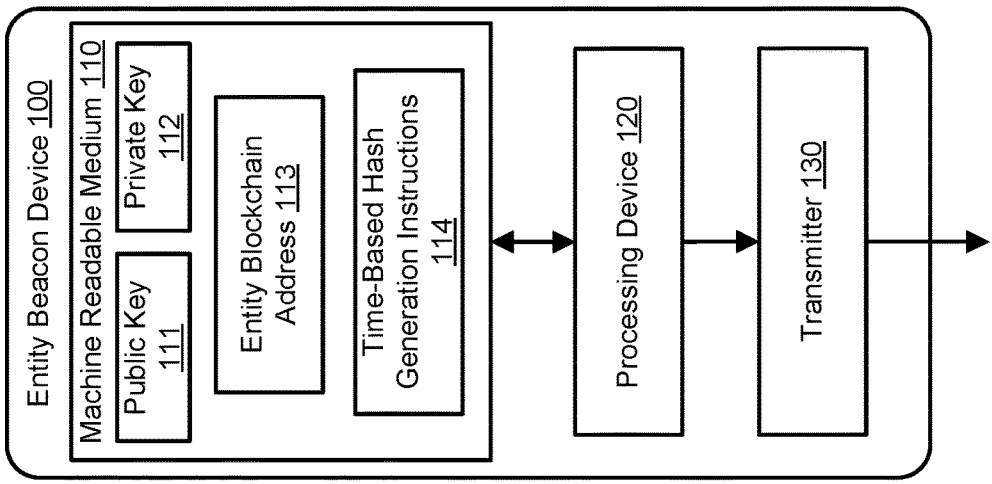
FIG. 2 is a block diagram illustrating an example architecture of components of an entity beacon device, in accordance with implementations of the disclosure.
Figure 4:
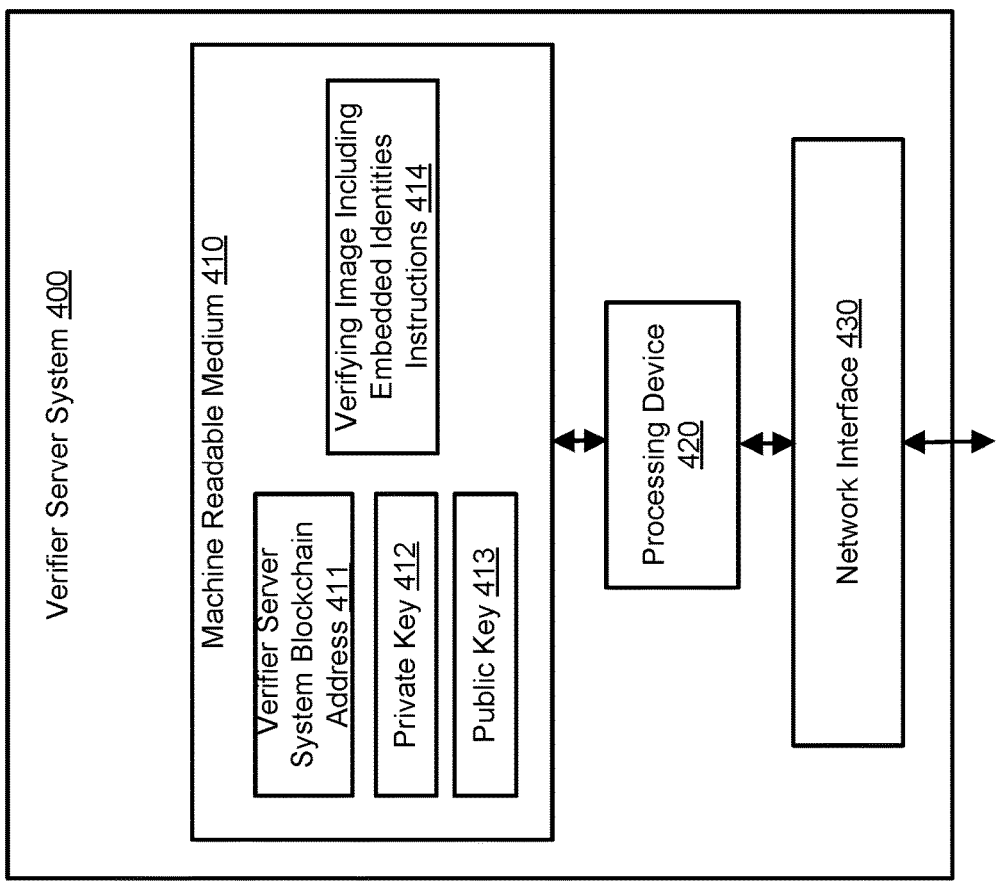
FIG. 4 is a block diagram illustrating an example architecture of components of a verifier, in accordance with implementations of the disclosure.

FIG. 1 is a diagram illustrating an example environment that uses entity beacon devices 100-1 to 100-N (individually referred to as an entity beacon 100) and a blockchain network 300 including a verifier server system 400 ("verifier 400") to capture verifiable images having an embedded immutable identity of things appearing in the image, in accordance with implementations of the disclosure. FIG. 1 will be described in conjunction with FIGS. 2, 3, and 4, which are block diagrams respectively illustrating an example architecture of components of an entity beacon device 100, client device 200, and verifier server system 400 (referred to herein as "verifier 400"), in accordance with implementations of the disclosure.

In the example environment of FIG. 1, each entity beacon device 100 is configured to transmit (e.g., broadcast) a beacon including a secured representation of an entity beacon's blockchain address. In particular, each entity beacon device 100 may be provisioned with a blockchain address 113 that is associated with a particular entity in the real world (or owner of the entity) from which the entity beacon device 100 transmits beacons. For example, an entity beacon device 100 may be associated with a person, a vehicle, an asset that is tracked along a supply chain, etc. Each entity beacon device 100 may be coupled to, carried by, or otherwise in the same location as the entity for which it transmits the secured representation of the blockchain address. For example, it may be a component of a vehicle, a component of a smartphone, and/or a component of an asset such as a package that is carried along a supply chain.

A mapping between each provisioned entity blockchain address 113 and its associated entity may be maintained by a central entity such as a blockchain address mapping server system 390 that is off chain. For example, a blockchain address mapping server system 390 may maintain a mapping between a provisioned entity blockchain address and an associated entity in an entity blockchain address database 391. It should be noted that although multiple entity beacon devices 100 are illustrated in the example of FIG. 1, in some implementations, the technology disclosed herein may be implemented with a single entity beacon device 100 where a single entity is captured in the image.

By virtue of an entity beacon 100 transmitting a secured representation of an entity blockchain address, information broadcast by entity beacon 100 may be secured from exposure and tampering from unauthorized parties. The beacons used may prevent tampering, preventing external parties from making any malicious changes or copying information from the beacon. For example, when interactions using a blockchain address as an identifier of an entity occur in the open, passive sniffers or other attacking devices may be able to gather personal information, information belonging to an organization, but the advertisements being one time advertisements are of no use after a particular short time period.

Each entity beacon device 100 may include a machine readable medium 110, a processing device 120, and a transmitter 130. The transmitter 130 of location beacon device 100, in some implementations, may utilize a short-range transmission technology such as Bluetooth®, Bluetooth® Low Energy (BLE), radio-frequency identification (RFID), Wi-Fi®, Near-Field Communication (NFC), Zigbee, and the like. In other implementations, the location device 100 may utilize other transmission technologies such as cellular transmission, satellite transmission, LORA, SIGFOX, etc.

The machine readable medium 110 may store the entity blockchain address 113, and a public key 111 and private key 112 corresponding to the entity blockchain address 113. For example, a public key 111 may be derived from the private key, and entity blockchain address 113 may be derived from the public key 111 by applying additional cryptographic algorithm(s). In some implementations, public key 111 can be used to derive entity blockchain address 113. Entity beacon device 100 may be provisioned with public key 111 (if different from blockchain address 113) and private key 112 during configuration of entity beacon device 100. Some deployments may not require the private key to be provisioned to the beacon device and may just have the public key, the blockchain address, and/or an ID as a reference to the blockchain address.

Each entity beacon device 100 may include time-based hash generation instructions 114 that, when executed by processing device 120, apply a time-based cryptographic hashing algorithm to entity blockchain address 113 to generate a secured representation of the entity blockchain address. The secured representation of the entity blockchain address may be generated by applying a one-time cryptographic hashing algorithm using a current timestamp and the entity blockchain address. The current timestamp may be obtained from processing device 120 (e.g., from a clock of the processing device 120). As an example, suitable time-based hash-based message authentication code (HMAC) algorithm may be utilized to generate the secured representation of the entity blockchain address. As illustrated in the example of FIG. 1, application of one-time cryptographic hashing algorithm generates a beacon including a time-based one time advertisement (TOTA) including the secured representation of the entity blockchain address provisioned in beacon device 100 (illustrated in FIG. 1 as TOTA-L1(B, T) for beacon device 100-1 at time T and TOTA-L2(B3, T+2) at time T+2 for beacon device 100-N).

In some implementations, for added security, an encrypted entity blockchain address 113 is stored in machine readable medium 110 of the constrained device 102. In such implementations, the encrypted entity blockchain address 113 is decrypted prior to applying the time-based cryptographic hashing function to produce the secure representation of the blockchain address.

In some implementations, an entity beacon device 100 may be implemented as a one-way transmitter to a receiving device within range (e.g., client device 200) that broadcasts a TOTA. For example, an entity beacon device 100 may be implemented as a one-way Bluetooth® beacon device.

Although each entity beacon device 100 is illustrated in FIG. 1 as transmitting beacons using radio frequency (RF) waves of virtually any frequency or modulation type, it should be appreciated that, in some implementations, an entity beacon device 100 may transmit a beacon using some other communication method such as a wired communication method (e.g., over coaxial and/or optical cables), a free space optical communication method (e.g., infrared, visible laser, etc.), or in a modulated soundwave (e.g., audible, subsonic, ultrasonic, etc.). Moreover, in an alternative implementation, each entity beacon device 100 may instead be implemented as a device that displays data that is scanned to obtain a secured representation of its provisioned entity blockchain address. For example, an entity beacon device 100 may display a QR code or barcode including an embedded secured representation of the entity blockchain address, and a client device 200, may scan the QR code (e.g., using a camera) to receive the secured representation of the entity blockchain address. In such implementations, the secured representation of the entity blockchain address embedded in the displayed QR may periodically change (e.g., depending on a configured time of the time-based hashing algorithm).

In another implementation, rather than having an entity beacon device 100 that broadcasts a secured representation of a blockchain address or displays a secured representation of a blockchain address, a fixed advertisement having a secured representation of an entity blockchain address may be scanned by client device 200 to obtain a secured representation of an entity blockchain address. As used throughout the disclosure, the term "scanning" may generally refer to using any suitable scanning technique to read a value, including video or image capture, infrared light capture, laser capture, manual data entry of a value, ultrasonic or subsonic scanning techniques, manual data entry, RFID-based scanning, scanning a 2D/3D barcode, using a wired technology to scan, etc.

In some implementations, entity beacon device 100 may broadcast more than one secured representation of a blockchain address at a time. For example, it generate a TOTA at a first time, a second TOTA at a second time, and transmit a beacon including the first and second TOTAs.

Referring now to client device 200, a user of client device 200 within range (e.g., wireless transmission range) of an entity beacon device 100 is configured to capture verifiable images having an embedded immutable identity of things appearing in the image. As further described below, a client device 200 may interact with a verifier 400 in an interactive proving protocol that uses entity level advertisements (e.g., secured representation of entity blockchain address) to prove the identity of entities captured in an image associated with entity beacon devices 100. Additionally, the client device 200 may interact with the verifier 400 to prove that the image was captured at a particular time and location. As a result of the interactive proving protocol, a distributed attestation may be created on a blockchain that attests to the identities of entities appearing in the image, and the location and time that the image was captured. Alternatively, a verifiable claim may be created off of the blockchain, or a reference to a verifiable claim may be created on the blockchain. The blockchain application running on the client device 200 may run in a trusted execution environment (TEE) to minimize tampering with the captured image or other data. It may also be used to directly write the captured image to a blockchain with captured secured representations of blockchain addresses. Alternatively, it may write it into an off-chain database with its reference in blockchain. Hence, the image and the captured secured representations of blockchain addresses may not be altered without detection.

As illustrated in FIG. 1, client device 200 may be a mobile device such as a smartphone, tablet, or notebook computer. In some implementations, client device may be implemented as a wearable device (e.g., smartwatch or head mounted display (HMD) device). In further implementations, client device may be implemented as a vehicle, a gaming device, a desktop computer, or any other type of device that may be configured to capture images with embedded identities of entities for verification on a blockchain network, in accordance with implementations of the disclosure.

A client device 200 may include a machine readable medium 210, a processing device 220, a display 230, a receiver 240, a transmitter 250, a position determination device 260, and a camera 270.

Receiver 240 may be to receive beacons broadcast by entity beacon devices 100 and communications (e.g., interactive question for proving image and embedded secured representations of blockchain addresses were captured at a particular time) from verifier 400. In implementations, receiver 240 may comprise multiple receivers (e.g., a receiver to receive beacons and a receiver to receive communications from a verifier 400). For example, receiver 240 may comprise a Bluetooth® receiver for receiving Bluetooth® beacons from an entity beacon device 100, and a cellular or Wi-Fi® receiver for receiving communications from a verifier 400.

Transmitter 250 may transmit communications to verifier 400 (e.g., responses to interactive questions) during a process for creating a verifiable image with embedded identities of entities. For example, transmitter 250 may be implemented as a cellular transmitter, a Wi-Fi® transmitter, a satellite communications transmitter, or some combination thereof. It should be appreciated that although receiver 240 and transmitter 250 are illustrated as being separate devices, in some implementations they may be implemented as a transceiver.

Communications between client device 200 and verifier 400 may occur over a communication network 275. Communication network 275 may comprise any communications network suitable for exchanging communications between a client device 200 and verifier 400. Some non-limiting examples of communication mediums over which client device 200 and verifier server 400 may connect to a communication network 275 include: wired communications mediums, such as cable, fiber-optic, or DSL; or wireless communications mediums, such as Wi-Fi®, free-space optical communications, cellular communications, satellite communications, etc. In some instances, a plurality of these communication mediums may be utilized. In some implementations, communication network 275 may be implemented as an intranet network (e.g., enterprise, campus, or personal intranet).

Communication network 275 may include one or more access points (APs) 276. An AP can refer to an access network node that can be used by an electronic device to gain access to a network. An AP 276 may be part of a wireless network (e.g., a Wi-Fi® network). An AP 276 may refer to a Wide Area Network) WAN or Low Power Wide Area Network (LPWAN) base station or transmission system base station, another low power long range access network (e.g., Lora and Sigfox) node, or an access node of a cellular network. Where communication network 275 includes a wired portion, an AP 276 may include a bridge, switch or router (or multiple switches/routers) to allow for communication of data with other nodes.

Machine readable medium 210 of client device 200 may include a blockchain wallet 211 and blockchain application 212. The blockchain wallet 211 may store the user's blockchain address 212, a public key 214 and private key 213 corresponding to the user's blockchain address 212. For example, a public key 214 may be derived from the private key 213, and the user's blockchain address 212 may be derived from the public key 214 by applying additional cryptographic algorithm(s). In some implementations, public key 214 and blockchain address 212 are the same, in which case machine readable medium 210 may store private key 213 and blockchain address 212. In some implementations, blockchain wallet 211 may be a subcomponent of blockchain application 215.

Camera 270 may be to capture images of entities. In implementations, software for utilizing camera 270 may run in a trusted executed environment (TEE) and run approved versions of unmodified code validated by the TEE. In some implementations, images captured by camera 270 may be encrypted using an encryption key within the TEE. By virtue of utilizing camera 270 within a TEE, alteration of captured images and/or access of captured images by unauthorized parties may be prevented. For example, once an image is captured, the blockchain application 215, which may also be running in a TEE, may write the picture with embedded TOTAs in to the blockchain or off-chain with reference to the blockchain. This may ensure that the image and secured representations of blockchain addresses are handled only by trusted entities, shared on the blockchain, and recorded as truth. As such, attempts to modify the image and data after writing to the blockchain may be difficult and detectable.

Position determination device 260 (e.g., GPS receiver) may be to capture location data (e.g., GPS coordinates) where an image is captured by camera 270. For example, assisted GPS, Wi-Fi®-based location, satellite GPS, or some combination thereof may be used to determine a location of client device 200. The captured location data (e.g., GPS coordinates) may be stored as metadata embedded within images captured by camera 270. In implementations, position determination device 260 may operate within the TEE of camera 270.

Client device 200 may utilize blockchain application 215 to interact with verifier 400 on blockchain network 300 as part of the process of creating a verifiable image with embedded identities of entities. To this end, blockchain application 215 may include instructions 216, that when executed by a processing device 220, capture and embed secured representations of entity blockchain addresses in an image. Blockchain application 215 may further include instructions 217, that when executed by a processing device 220, prove the identities of entities embedded in captured images. As further described below, once an image and associated secured representations of entity blockchain address are captured on blockchain, computer vision (e.g., including object recognition and/or identification techniques) and/or other associated technologies may be applied to an image to validate that all embedded secured representations of entity blockchain addresses are associated with entities that appear in the image.

It should be noted that although client device 200 is illustrated as communicating on-chain with verifier 400 in the example environment of FIG. 1, in other implementations, communications between client device 200 and verifier 400 may occur off-chain. Moreover, although client device 200 is illustrated as being outside of blockchain network 300, it should be appreciated that client device 200 may function as a node on blockchain network 300. For example, client device 200 may function as a limited access node that may write or view transactions on blockchain network 300, but may not validate transactions on blockchain network 300.

Referring now to blockchain network 300, blockchain network 300 may be implemented as a consortium blockchain network. For example, blockchain network 300 may be implemented by an enterprise consortium of companies that operate the blockchain for specific applications, including the verification of an image included embedded identities of entities. For example, in cases where blockchain network 300 is to verify images taken at car accident scenes, blockchain network 300 may be implemented by a consortium including insurance agencies, law enforcement, and vehicle owners.

Blockchain network 300 may include a plurality of nodes (e.g., verifier 400 and other blockchain nodes 350) and other components as needed depending on the type of blockchain implementation that may validate transactions such as distributed attestation transactions that create an immutable record on a blockchain that may be used to prove the identity of things embedded in captured images. Some or all blockchain nodes may store a respective copy of a blockchain including attestation transactions made between client devices 200 and verifiers 400 in the blockchain network 100. In some example implementations, the blockchain may be implemented as a chronologically ordered, back-linked list of blocks. In some implementations, nodes on blockchain network 300 (e.g. client device 200) may be able to write transactions, but not verify transactions. It should be appreciated that although a single verifier 400 is illustrated in the example of FIG. 1, other blockchain nodes 350 may also operate as a verifier to prove other claims made by other client devices.

A verifier 400 within blockchain network 100 may be configured to engage in an interactive proving protocol with a client device 200 to verify the embedded identities of things captured in an image, and that the image was captured at a particular time and location. Following verification, verifier 400 may create a distributed attestation on the blockchain that attests to the identities of entities embedded in an image along with the time and location that the image was captured.

As further described below, a client device 200 may interact with a verifier 400 in an interactive proving protocol that uses entity level advertisements (e.g., secured representations of entity blockchain address) to prove the identities of things appearing in a photograph captured at a particular time. As a result of the interactive proving protocol, a distributed attestation may be created on a blockchain that attests to the presence of a user of client device 200 at a given location and time.

As shown, a verifier 400 may include a machine readable medium 410, processing device 420, and network interface 430. Machine readable medium 310 may store a blockchain address 411 corresponding to the verifier server system, and a private key 412 and public key 413 corresponding to the blockchain address 411. Machine readable medium 410 may also store instructions 414, that when executed by a processing device 420, verify an image included embedded identities. Additionally, execution of the instructions may verify that the image was captured at a particular location, that the image was captured at a particular time, and/or that the image was captured by a particular user.

Network interface 430 may be to communicate with client device 200 (e.g., over communication network 275). Network interface 430 may also be to communicate with a blockchain address mapping server system 390, which as further described below, is configured to maintain a mapping between clear and secured representations of blockchain address provisioned at entity beacon devices 100. In some implementations, blockchain address mapping server system 390 may maintain mappings between clear and secured representations of blockchain addresses provisioned or otherwise used at other devices. For example, it may maintain a mapping between a clear and secured representation of a location blockchain address provisioned at a location beacon device or a user blockchain address (e.g., blockchain address associated with user of client device 200). Although blockchain address mapping server system 390 is illustrated in the example of FIG. 1 as being separate from verifier 400, in some implementations blockchain address mapping server system 390 may be integrated into verifier 400. Moreover, although blockchain address mapping server system 390 is illustrated as operating outside the blockchain network 300, in some implementations it may operate on the blockchain network 300.

Some implementations of the environment of FIG. 1 may include a location beacon device 500 that transmits (e.g., broadcasts) a beacon including a secured representation of a location's blockchain address. The location beacon device 500 may be provisioned with a blockchain address that is associated with a particular location in the real world from which the location beacon device 500 transmits beacons. To this end, the location beacon device 500 may remain fixed to the location corresponding to its provisioned location blockchain address. For example, a provisioned location blockchain address may be used to identify a pair of longitudinal and latitudinal coordinates, a specific indoor location, a specific outdoor location, an object having a fixed and known location, etc. In some implementations, the location may comprise a geographical area or range from which signals may be received from the location beacon device 500 (e.g., before signal attenuation).

The components of location beacon device 500 may be substantially similar to the components of an entity beacon device 100, except that the device is instead provisioned with a location blockchain address, and it may store public and private keys associated with that location blockchain address.

In some implementations, location beacon device 500 may broadcast more than one secured representation of a blockchain address at a time. For example, it generate a TOTA at a first time, a second TOTA at a second time, and transmit a beacon including the first and second TOTAs.

In some implementations, a fixed advertisement containing a secured representation of a location blockchain address may be used in place of a location beacon device 500. In such implementations, a client device 200 may scan the fixed advertisement to obtain the secured representation of the location blockchain address.

A mapping between each provisioned location blockchain address and its associated location may be maintained by a central entity such as a node 350 on blockchain network 300 or a device that is off chain. For example, a blockchain address mapping server system 390 may maintain a mapping between a provisioned location blockchain address and an associated location in a database of server system 390. This mapping may be taken care of during the provisioning process.

The secured representation of the location blockchain address may be embedded as metadata in images captured by camera 270, and may provide a secured alternative to embedding location data (e.g. GPS coordinates) captured by position determination device 260. By virtue of a location beacon device 500 transmitting a secured one time advertisement as a representation of a location blockchain address, which is associated with a location, information broadcast by a location beacon device 500 may be secured from exposure and tampering from unauthorized entities. The beacons used may prevent tampering, preventing external parties from making any malicious changes or copying information from the beacon. For example, when interactions using a blockchain address as an identifier of location occur in the open, passive sniffers or other attacking devices may be able to gather location information belonging to an organization, but the advertisements being one time advertisements are of no use after a particular short time period.

Figure 5:
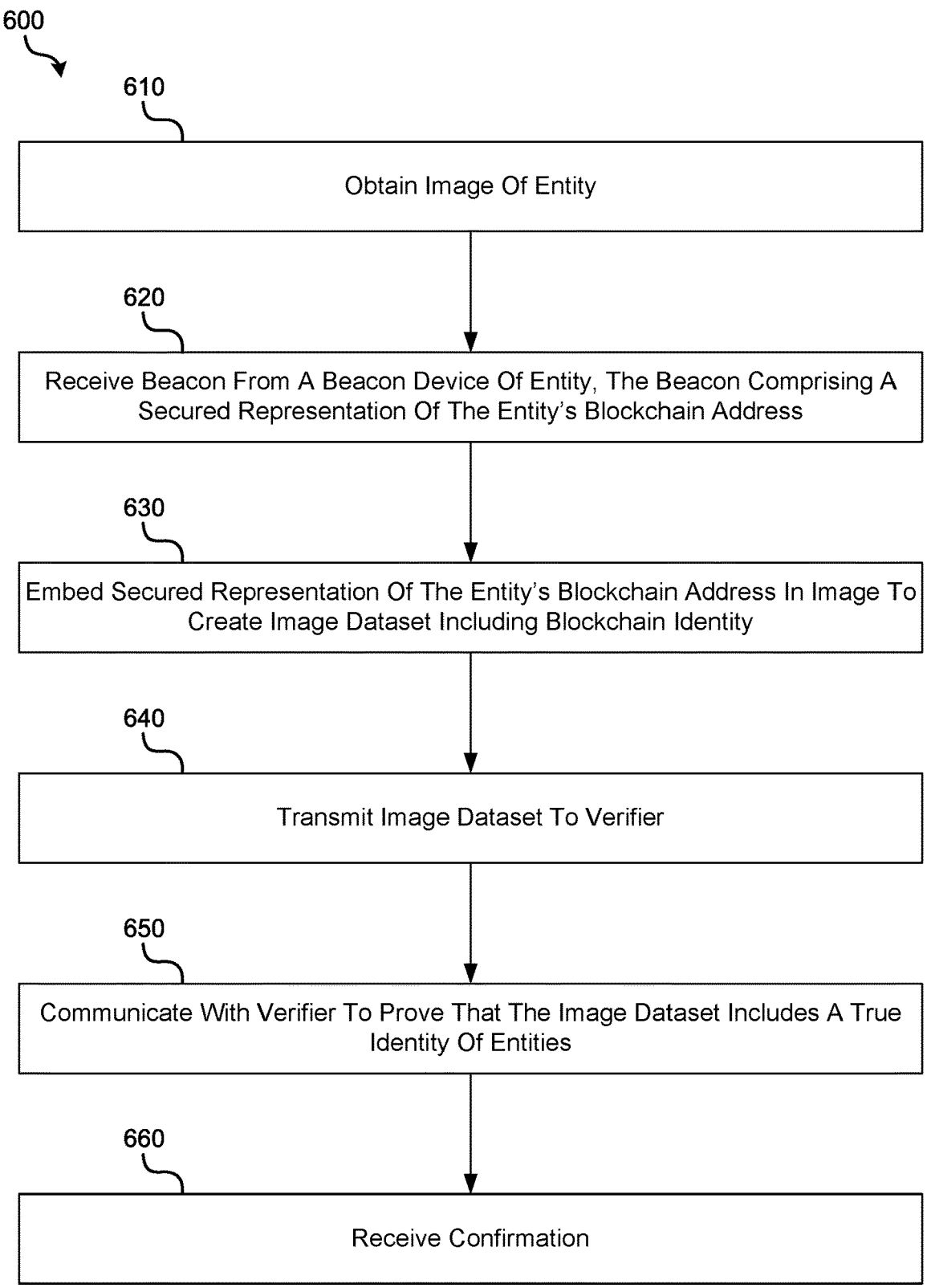
FIG. 5 is an operational flow diagram illustrating an example method that may be implemented by a user of client device to create a verifiable image with embedded identities of entities, in accordance with implementations of the disclosure.

FIG. 5 is an operational flow diagram illustrating an example method 600 that may be implemented by a user of client device 200 to create a verifiable image with embedded identities of entities, in accordance with implementations of the disclosure. Method 600 may be implemented by a processing device 220 executing instructions 216 and 217.

Figure 6:
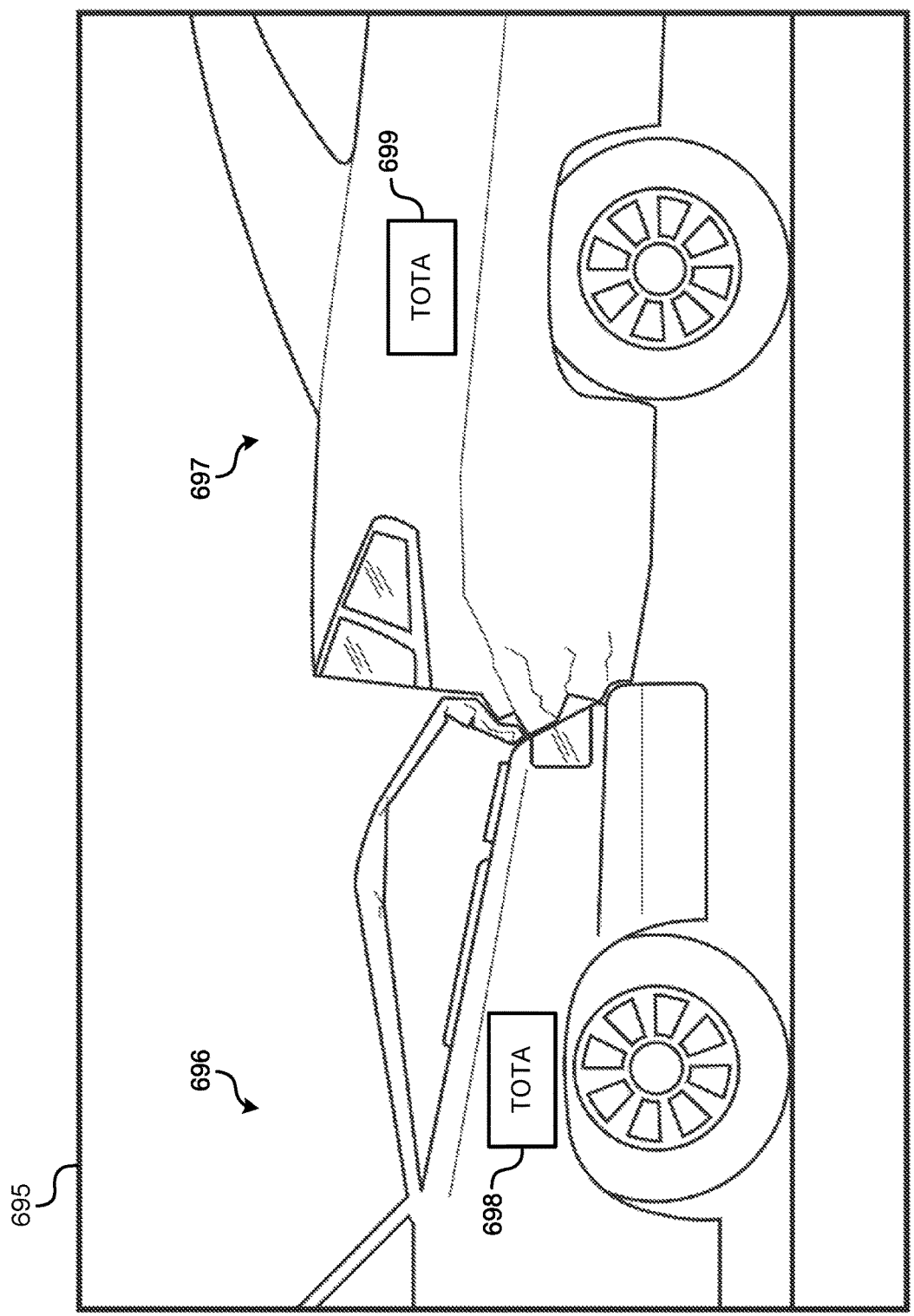
FIG. 6 illustrates an image that may captured by a camera of the client device of FIG. 3.

At operation 610, the client device 200 obtains an image of one or more entities. By way of example, FIG. 6 illustrates an image 695 that may captured by the camera 270. The image 695 shows the result of a collision between vehicle 696 and vehicle 697. The image may be captured as part of a process of creating a verifiable image to be submitted to insurance. The image may be captured in a TEE.

In alternative implementations rather than capturing an image of one or more entities using a camera 270, client device 200 may obtain an image such as a rendered image, a video frame, a radiograph image, a thermal image, a radar pattern image, or any other digital reproduction or digital representation of a person, place, or thing.

At operation 620, the client device 200 receives a beacon from an entity beacon device 100, the beacon comprising a secured representation of the entity's blockchain address.

For example, as illustrated in the example of FIG. 1, client device 200 may receive the one time advertisement TOTA-E1 from beacon device 100-1 and the one time advertisement TOTA-E2 from beacon device 100-2 at time T. In implementations, client device 200 may be configured to automatically receive entity beacons at substantially the same time it captures images of the entities. For example, in response to obtaining the image, client device 200 may simultaneously capture entity beacons transmitted by entity beacon devices (e.g., using receiver 240). In implementations where the entity beacon device 100 transmits beacons using free space optical communications, the camera 270 may be configured to capture, with the image, the beacon including the secured representation of the entity's blockchain address.

Referring again to the vehicle collision example of FIG. 6, the client device 200 may capture a beacon including a TOTA 698 transmitted by a beacon device of vehicle 696 and a beacon including a TOTA 699 transmitted by a beacon device of vehicle 697. Although the captured TOTAs 698-699 are illustrated in example image 695 as visible image tags, it should be noted that the captured TOTAs may be embedded in the image without making them visible to a viewer of the image.

In alternative implementations, rather than receiving a beacon containing a secured representations of the entity blockchain address, client device 200 may scan a fixed advertisement containing the secured representation of the entity blockchain address.

At operation 630, the client device 200 embeds each captured secured representation of an entity blockchain address in the obtained image to create an image dataset including one or more blockchain identities. In some implementations, the secured representation of the entity blockchain address may be stored as metadata in the obtained image to create the image dataset. In some implementations, the image dataset may include a reference to a location in the image (e.g., coordinates, pixel locations, etc.) corresponding to each embedded secured representation of an entity blockchain address.

In some implementations, client device 200 may also capture location data (e.g., GPS coordinates that are captured using a position determination device 260) and embed the location data in the obtained image (e.g., as metadata) to create the image dataset. Alternatively, client device 200 may capture a secured representation of a location blockchain address (e.g., capture TOTA-L from location beacon device 500), and embed the secured representation of the location blockchain address in the obtained image (e.g., as metadata).

In some implementations, client device 200 may also embed an identity of the user in the obtained image to create the image dataset. For example, processing device 220 may execute time-based hash generation instructions 218 to generate a secured representation of the user blockchain address 212, and embed the secured representation of the user blockchain address in the obtained image. The secured representation of the user's blockchain address may be generated in substantially the same manner as described above with reference to generating the secured representation of the entity blockchain address. For example, the secured representation of the user's blockchain address may be generated by applying a one-time cryptographic hashing algorithm using a current timestamp and the user's blockchain address 212.

At operation 640, the client device 200 transmits the image dataset to the verifier 400. The transmitted image dataset may include the obtained image, one or more embedded secured representations of entity blockchain addresses, an embedded secured representation of a location blockchain address, location data (e.g., GPS coordinates) captured by position determination device 260, a secured representation of the user blockchain address, and/or a timestamp of when the image was obtained (e.g., captured by a camera).

At operation 650, the client device 200 communicates with the verifier 400 to prove that the image dataset includes a true identity of entities, which are represented in the dataset as secured representations of entity blockchain addresses. It may also communicate with the verifier 400 to prove the location and time of the obtained image. Client device 200 and verifier may engage in an interactive proving protocol at this step. Client device 200 may capture, at a later time, an additional secured representation of an entity blockchain address from each of the entities. For instance, as illustrated in the example of FIG. 1, client device 200 transmits TOTA-E1 and TOTA-E2 captured at time T+2. By virtue of the time-based hash generation instructions generating a new value over time, this may be used to confirm that the first captured beacons were captured at the advertised time. Even in situations where a malicious party cracks the time-based hashing algorithm for one beacon at a particular time, the system may be safeguarded if the party is unable to crack the time-based hashing algorithm at a later time. In some implementations client device 200 may also be asked to obtain a second image of the entities at the later time (along with the secured representations of the blockchain addresses).

In some implementations, operation 650 may be skipped. For example, transmission of a first TOTA from the client device may be sufficient to prove the location and time of the obtained image. Based on the business case, one or more correct TOTAs may be sufficient to generate an attestation. In other cases, there may be a need for multiple rounds of questioning and asking the prover (e.g., client device) to capture more information from the location and the involved asset TOTAs.

At operation 660, client device receives a confirmation message from verifier 400 that the obtained image and embedded identities of the entities have been verified. In implementations, the confirmation message may identify a blockchain transaction identifier (ID) of a distributed attestation transaction stored on the blockchain of blockchain network 300. The distributed attestation transaction stored on the blockchain may be digitally signed by verifier 400 and digitally attest to the authenticity of the image and the embedded identities of entities in the image. It may also attest to the time and location the image was obtained (e.g., captured by a camera). The distributed attestation transaction may be reusable by the user of client device 200 to prove, to various entities (e.g., various members of the blockchain consortium corresponding to blockchain network 300) the authenticity of the image and the identities of entities appearing in the image. For example, the client device may lookup, on the blockchain, the transaction associated with the ID. In the future, the user may use this signed attestation as a proof.

Figure 7:
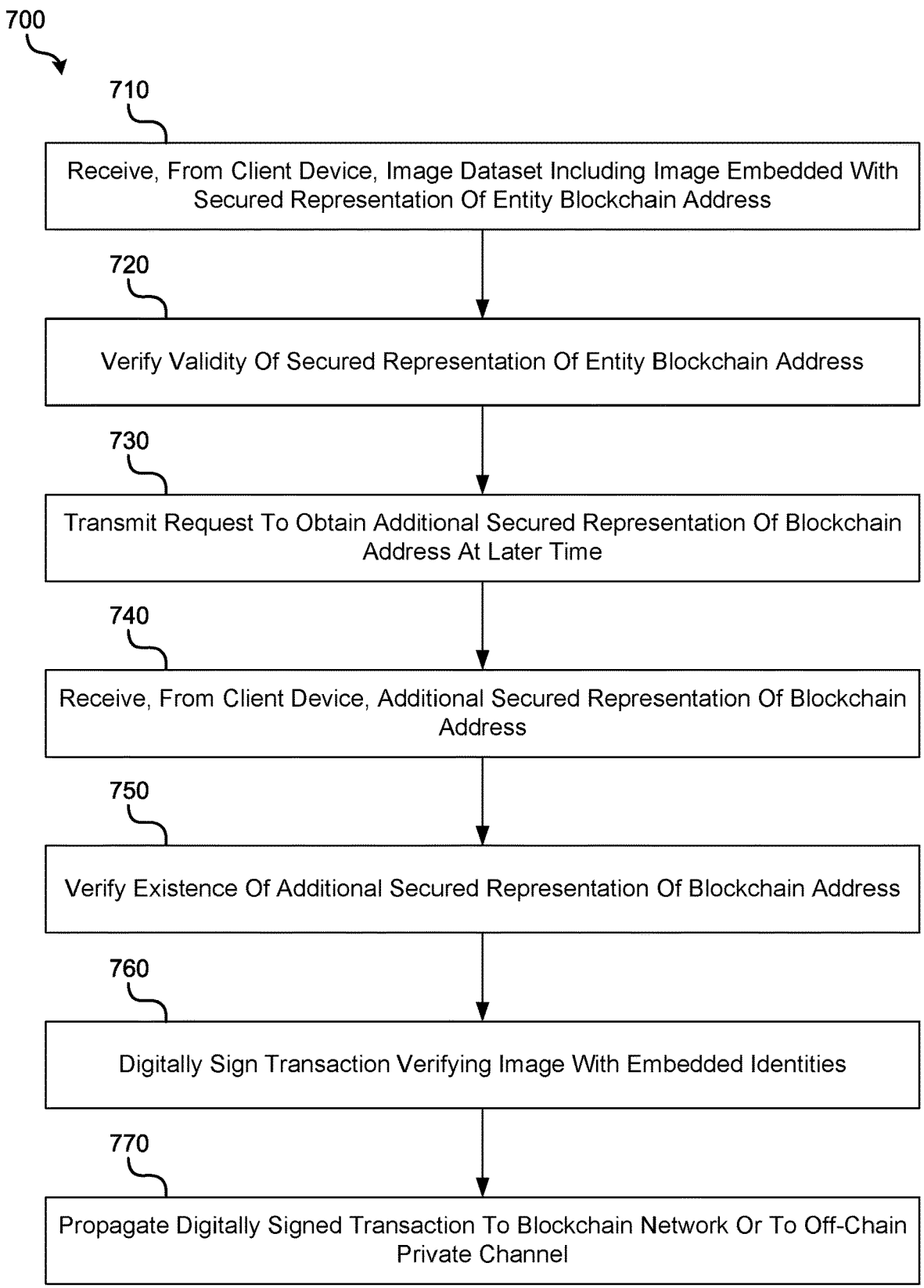
FIG. 7 is an operational flow diagram illustrating an example method that may be implemented by a verifier to verify an image including an embedded identity of one more entities, and to create a distributed attestation on a blockchain that attests to the veracity of the image and embedded identities, in accordance with implementations of the disclosure.

FIG. 7 is an operational flow diagram illustrating an example method 700 that may be implemented by a verifier 400 to verify an image including an embedded identity of one or more entities, and to create a distributed attestation on a blockchain that attests to the veracity of the image and embedded identities, in accordance with implementations of the disclosure. Method 700 may be implemented by a processing device 420 executing instructions 414 for verifying an image including embedded identities.

At operation 710, verifier 400 receives from client device 200 an image dataset including an image embedded with a secured representation of an entity's blockchain address (e.g., TOTA-E1 and/or TOTA-E2). In implementations, the image may be a photograph or video frame captured with a camera, a radiograph image, a thermal image, a radar pattern image, or any other digital reproduction or digital representation of a person, place, or thing. In particular implementations, the received image may have been captured in a TEE. In some implementations, the image dataset may also include a secured representation of a location blockchain address, GPS coordinates, a secured representation of a user blockchain address associated with the user of client device 200, and/or a timestamp.

At operation 720, verifier 400 verifies the validity of the secured representation of the entity blockchain address embedded in the image. In particular, verifier 400 may query blockchain address mapping server system 390 to perform this verification. As illustrated, blockchain address mapping server system 390 may include an entity blockchain address database 391 of entity blockchain addresses (e.g., entity blockchain addresses that were registered to entity beacon devices 100 during provisioning), and time-based hash generation instructions 392 that may generate a secured representation of the location blockchain addresses. In particular, location time-based hash generation instructions 392 may apply the same time-based hashing algorithm to a blockchain address as time-based hash generation instructions 114 to generate the same secured representation of the location blockchain addresses.

The secured representations of entity blockchain addresses generated using entity time-based hash generation instructions 392 may be stored in entity blockchain address database 391 to maintain a mapping between clear versions of entity blockchain addresses and secured versions of entity blockchain addresses. In implementations, the mapping between secured representations of entity blockchain addresses and clear versions of entity blockchain addresses may be maintained in a table or other data structure of database 391. As such, in response to a query received from verifier 400 to verify the validity of a secured representation of an entity blockchain address, blockchain address mapping server system 390 may perform a lookup function in database 391 to take the secured representation of the entity blockchain address received in a query from verifier 400, and retrieve a corresponding clear version of the entity blockchain address that is returned to verifier 400. By virtue of verifier 400 communicating with the blockchain address mapping system 390, verifier 400 may determine the identity (in the form of a clear version of the blockchain address) of the entity (or entities) from which client device 200 received a one-time advertisement during image capture.

In some implementations, to account for a lack of time synchronization between an entity beacon device 100 and the blockchain address mapping system 390, the blockchain address mapping server system 390 may configure a time offset period that represents the difference in time synchronization between an entity beacon device 100 and the blockchain address mapping system 390.

In implementations where the received image dataset is embedded with secured representations of location and/or user blockchain addresses, verifier may similarly query a blockchain address mapping server system (e.g., server system 390) that maintains mappings between clear versions of location/user blockchain addresses and secured representations of the location/user blockchain address. The mapping may be maintained in the same manner as discussed above with reference to database 391. In some instances, the mapping may be maintained using database 391.

In addition to validating the existence of blockchain addresses associated with the one or more secured representations of blockchain addresses, at operation 720, computer vision (e.g., including object recognition and/or identification techniques) and/or other associated technologies may be applied to the image to confirm that all embedded secured representations of entity blockchain addresses are associated with entities that do in fact appear in the captured image. To this end, blockchain address mapping server system 390 or some other server system may be queried by verifier 400 to determine that the association between a captured image and embedded secured representations of blockchain addresses are correct. For example, after a clear version of an entity blockchain address is determined, image recognition techniques may be applied to verify that the clear version of the blockchain address is the identity of the entity appearing in the captured image.

Referring again to FIG. 7, at operation 730, verifier 400 transmits a request to client device 200 to obtain a second secured representation of a blockchain address at a later time. The request may be transmitted in accordance with an interactive proving protocol whereby verifier 400 asks client device 200 one or more questions to improve the confidence that the captured image dataset is valid. For example, the request may ask that the client device 200 retrieve, at a later time, a second secured representation of the entity blockchain address(es). To prevent tampering, the later time may be sufficient for the time-based hash generation instructions of each of the entity beacon devices to generate a new value. In implementations, verifier 400 is configured to accept only one usage of a TOTA. In such implementations, a second time usage of the same TOTA for verification may be considered a failed attempt by the verifier.

At operation 740, in response to the request, verifier 400 receives from client 200 a message including a second secured representation of a blockchain address (e.g., TOTA-E1 and TOTA-E2 received at time T2). At operation 750, verifier 400 verifies the validity of the received additional secured representation of the blockchain address. For example, verifier 400 may verify TOTA-E1 and TOTA-E2 captured at time T2. In particular, verifier 400 may query blockchain address mapping server system 390 to perform this verification.

In some implementations, operations 730-740 may be skipped by verifier 400. For example, operations 730-740 may be skipped if time and processing power are more important to the business than the level of confidence and security in the captured image with embedded identities. In such cases, the first secured representation of the blockchain address may be sufficient for the proof.

At operation 760, verifier 400 may digitally sign an attestation transaction verifying the image and embedded identities of entities appearing in the image. Verifier 400 may sign the transaction using a private key 412 associated with its blockchain address. At operation 670, verifier 400 may propagate the digitally signed attestation transaction to blockchain network 300 (e.g., to create a distributed attestation transaction on the blockchain) or to private channels as approved earlier for future usage by the client to prove the presence of entities in a captured image at a particular time and location.

As such, once the verification process is complete, the verifier 400 may either i) store the image with embedded TOTAs and its attestation into a blockchain, ii) store the image in an off-chain database and refer to it in an attestation made on the blockchain, or iii) store the image off-chain and send the attestation over a private channel to a group of participants. In the third variant, the verifier 400 may advertise a reference to the off-chain attestation on to the blockchain to improve privacy and secrecy. As should be appreciated, these variations may depend on privacy requirements and the business use case.

In implementations, the attestation transaction may be broadcast by verifier 400 to all or a subset of nodes 350 on blockchain network 300. In implementations where the digital attestation transaction is broadcast to a subset of nodes 350, the digital attestation transaction may be propagated by receiving nodes 350 to other nodes 350 on the blockchain network 300 that did not receive the broadcast.

Thereafter, the nodes of blockchain network 300 may come to a consensus that validates the attestation transaction and updates the blockchain with a block or a distributed ledger entry including the validated transaction.

After a consensus has been reached by the blockchain network 300, the verifier and other blockchain nodes 350 may receive a new block containing the validated transaction and update their respective copy of the blockchain. After validation, verifier 400 may transmit a confirmation message to client device 200. The confirmation message may include a reference to the attestation transaction ID of the attestation transaction stored on the blockchain network 350.

Figure 8:
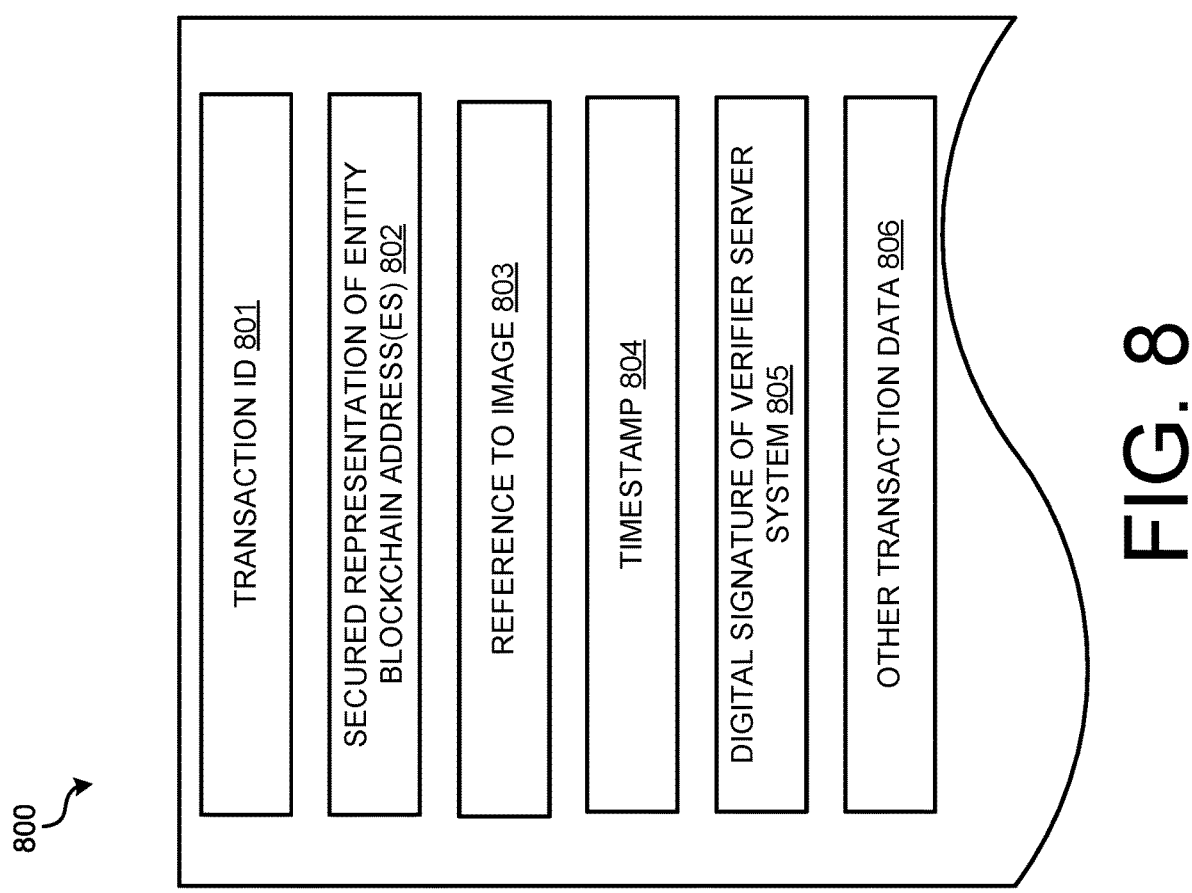
FIG. 8 illustrates an example data structure of a digitally signed attestation transaction verifying an image included embedded blockchain identities, that may be recorded on a blockchain in accordance with implementations of the disclosure.

FIG. 8 illustrates an example data structure of a digitally signed attestation transaction 800 verifying an image included embedded blockchain identities, that may be recorded on a blockchain in accordance with implementations of the disclosure. Attestation transaction 800 may be recorded on a blockchain of blockchain network 300. Attestation transaction 800 may include a blockchain transaction ID 801, a secured representation of an entity blockchain address 802, a reference to the image 803, a timestamp 804 of the time when the picture was taken by the user, a digital signature 805 of a verifier, and other transaction data 806 (e.g., secured representation of location blockchain address, secured representation of user blockchain address, GPS coordinates, and/or public keys associated with entity, verifier, location, a timestamp of the transaction, and/or user, etc.) In the case of the vehicle collision of FIG. 6, for example, transaction 800 may be used for an insurance claim to prove an accident occurred at a particular time and place between vehicles 696 and 697.

In implementations, the reference to the image 803 may be a pointer, which may be the blockchain address of a storage location or storage transaction that stores the image on blockchain network 300. For example, the image may be stored in a distributed storage system that provides decentralized storage of data corresponding to blockchain transactions. The distributed storage system may include a distributed arrangement of storage nodes that store data (e.g., images) corresponding to blockchain transactions. Nodes that are part of blockchain network 350 (e.g., full nodes) may retrieve data from the distributed storage system. As such, the image with embedded identities may also be stored in an off-chain storage system, which may be trusted with data storage and versioning, or implemented on TEE or a blockchain based distributed storage system platform such as SWARM.

In other implementations, the attestation transaction 800 may include the image.

By virtue of storing on a blockchain network 300 the captured image and embedded identities (or a reference to the captured image) that have been verified, an assurance may be provided that the image was not modified (by virtue of the immutability of the blockchain) and that the identities of things embedded in the image are true.

Example attestation transaction 800, although available for viewing by other nodes 350 on blockchain network 300, discloses a limited amount of information. In particular, it includes a secured representation of the entity blockchain address(es), and it may include secured representations of location and/or user blockchain addresses. By virtue of disclosing a limited amount of information, certain information (e.g., entity identity) may be masked from other nodes 350 that do not need to know this information. For example, only authorized users may provide this information as a verifiable claim to another verifier (e.g., another blockchain node 350) on a need to know basis.

For example, a client device owning the attestation may present it to another verifier that has access to verify the attestation using a blockchain address mapping server system 360. The verifier may also check with the backend database (e.g., blockchain address mapping server system 390) if it is signed by the owner for verification by this verifier. The response from the backend database may be a 'true' or 'false' response when attestations are submitted for verification. This may prevent any leak of information about entities and locations associated with an image despite this being written in to a blockchain. This may provide privacy and security.

In some implementations, rather than storing attestation transaction 800 on the blockchain network, an off-chain reference to a digital attestation may instead be recorded on the blockchain.

Method and system to capture a time series of immutable identities of location, things, and time based on Blockchain and other Distributed Ledger Technologies Although implementations thus far have been described in the context of capturing identities of things at a particular time and place in an image, in business environments such as supply chain management it may be useful to capture a time series of identities representing entities or movement of entities over time. For example, in the tracking of package shipments, it may be useful to track if packages flowed through the proper routes and arrived at the destination and/or intermediate locations at scheduled times. As another example, in the food industry it may be useful to track if food items were kept in cold storage through a mandated period or if they were taken out before then. As yet another example, in security clearance, it may be useful to know if individuals having access to highly secure areas followed the right routes or if there were any suspicious changes in their routes.

Figure 9:
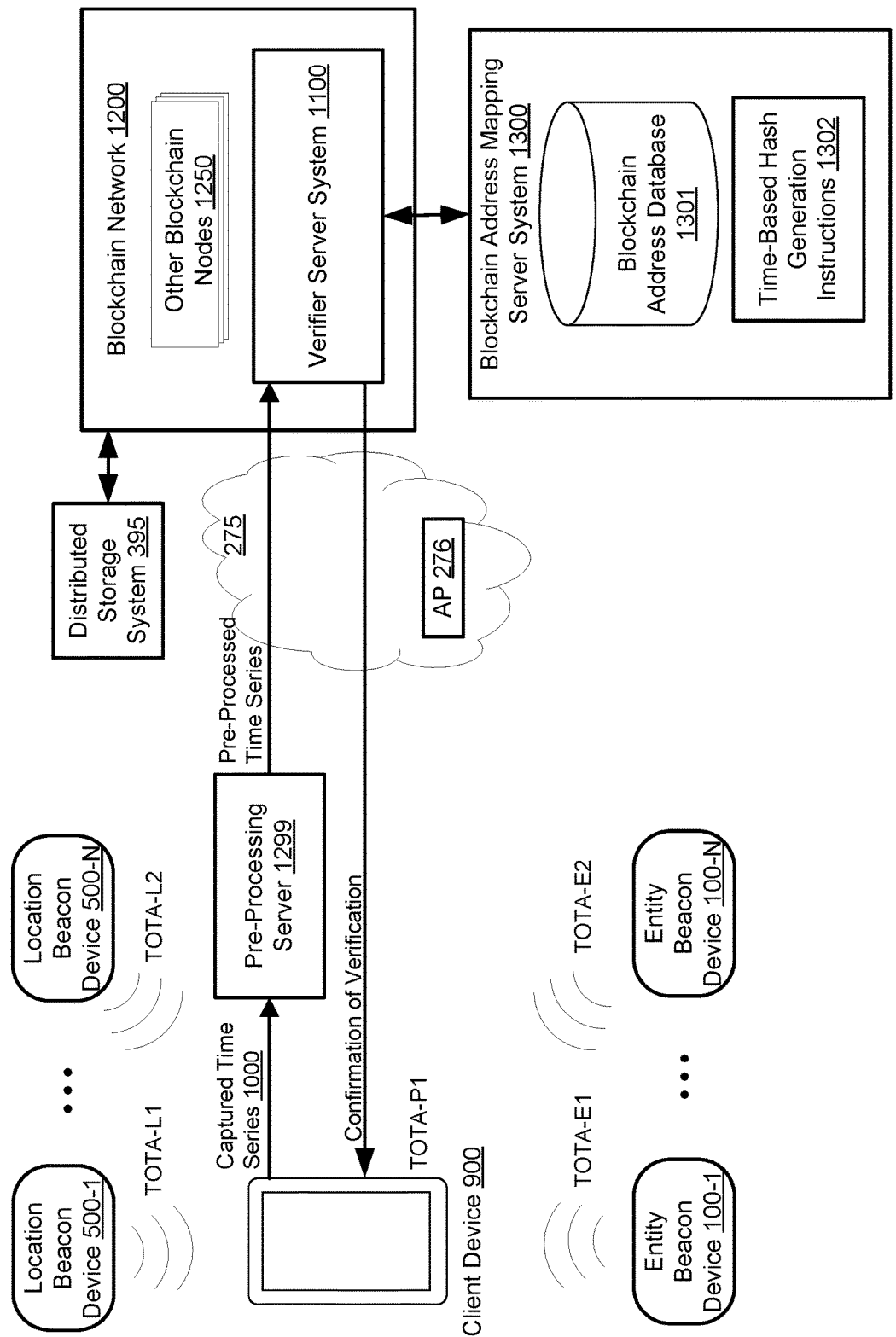
FIG. 9 illustrates an example environment for capturing a time series of blockchain identities of entities and/or locations over time, in accordance with implementations of the disclosure.

To this end, FIG. 9 illustrates an example environment for capturing a time series of blockchain identities of entities and/or locations over time, in accordance with implementations of the disclosure. In the example environment of FIG. 9, client device 900 captures a time series 1000 including secured representations of blockchain addresses of one or more entities, one or more locations, and/or the user. For example, as illustrated in the example environment of FIG. 9, for a given time T, client device 900 may capture TOTAs by one or more location beacon devices 500 (e.g., TOTA-L1, TOTA-L2), TOTAs by one or more entity beacon devices 100 (e.g., TOTA-E1, TOTA-E2), and a TOTA generated by client device 900 (e.g., TOTA-P1). In implementations, the captured secured representations of blockchain addresses may be embedded in images that are obtained as part of the time series. For example, the images may be obtained by capturing them using a camera of client device 900 that operates in a TEE as discussed above.

In some implementations, entity beacon devices 100 may be coupled to assets (e.g., bag at airport, package being delivered, jewelry) that are tracked over time for a business purpose such as supply chain management. In such implementations, the entity blockchain address 113 of the entity beacon device 100 may correspond to a blockchain address of the asset. The asset blockchain address may be provisioned at the time that beacon device is coupled to the asset. The beacon device 100 may be coupled to the asset in any suitable manner. For example, the beacon device may be removably coupled to a bag or package as an RFID tag or BLE tag. In some implementations, for added security, the coupling between the beacon device and asset may be secured (e.g., using a lock) to prevent tampering.

As such, in some implementations client device 900 generates a time series 1000 associated with the movement of one or more assets over a plurality of locations, where a beacon device 100 is coupled to each asset, and where a location beacon device 500 is present at each of the plurality of locations. Alternatively, fixed advertisements may be coupled to each asset, and the client may scan the fixed advertisements to obtain secured representations of asset blockchain addresses. The time series may serve as proof that an asset was moving along a path and had other assets moving along with it, for a time span. The capture of identities in a time series may be in one location or the capture may be done while in motion.

FIG. 10 illustrates three different examples of time series 1000 including images and secured representations of blockchain addresses that may be captured by a client device 900, in accordance with implementations of the disclosure. In these examples, for each time of the time series, captured secured representations of blockchain addresses may be embedded in the image corresponding to their time. TOTAs of asset beacon devices are represented as TOTA-A1 and TOTA-A2. TOTAs of location beacon devices are represented as TOTA-L1 to TOTA-LN. TOTAs of client devices are represented as TOTA-P1 and TOTA-P2.

At times, it may not be viable to send all of the time series data 1000 to a verifier 1100 or blockchain network 1200. As such, in some implementations, illustrated by FIG. 9, a pre-processing server 1299 (e.g., a local server) is configured to pre-process the time series data prior to it being sent to a verifier 1100. Pre-processing server 1100 may operate as an edge processing device that may store and analyze captured time series data 1000 collected by client device 900 and perform pre-processing to reduce the size of time series data 1000 that is sent to blockchain network 1200. Alternatively, pre-processing server 1299 may be implemented as a cloud-based processing device, and it may receive time series data 1000 from client device 900 over the cloud. It may preprocess the captured time series data 1000, and based on specific conditions, send the data to the verifier 1100. In other implementations where pre-processing of time series data is not needed, server 1299 may be omitted.

By way of example, consider the case of a location-based system that generates one hundred attributes every ten seconds. It may be impractical to write such a dataset into a blockchain and/or have such a dataset processed by a verifier, particularly in circumstances where only a few attributes are tracked and updates to the blockchain are only required when a particular threshold is crossed. In this example, an edge device (e.g., pre-processing server 1299)

may run the logic or code to detect crossing of the threshold for attributes of interest, and share this information with the verifier or blockchain network only when the asset state changes from one threshold level to another.

Time series 1000-1 may be captured by a client device 900 in instances where the transport of a single asset by the same user (e.g., user using client device 900) is tracked over different locations over time. An image (e.g., video frame, photograph, radiograph image, or any other digital reproduction or digital representation of a person, place, or thing) of the tracked asset may be obtained at each time T. Time series 1000-1 may serve as a proof by the user that custody of an asset was kept over time at various locations.

Time series 1000-2 may be captured in instances where the custody of multiple assets by the same user (e.g., user using client device 900) is tracked over the same location over time. An image of the tracked assets may be obtained at each time T. Time series 1000-2 may serve as a proof by a user of when custody of different assets was maintained at a given location over time. For example, time series 1000-2 shows that custody of asset A1 at location L1 by user P1 was lost between time T2 and TN.

Time series 1000-3 may be captured in instances where the custody of a single asset is transferred between users over different locations over time. An image of the tracked asset may be obtained at each time T. Capture of time series 1000-3 may require multiple client devices 900. The different portions of the time series captured by each client device 900 may be combined prior to verification.

It should be appreciated that many different instances of time series may be captured depending on the business requirements of the environment. For example, in supply chain management, a single asset or multiple assets may be tracked over time. Additionally, the tracked location may change or stay the same. As such, the entity beacon devices 100 from which secured representations of entity blockchain addresses are captured, and the location beacon devices 500 from which secured representations of location blockchain addresses are captured, may change over time. Additionally, it should be appreciated that, in some implementations, the client device 900 used to capture a time series may change. In such cases, secured representations of multiple user blockchain addresses may be generated over time for inclusion in a time series.

In some implementations, other data besides images and secured representations of blockchain addresses may be captured or obtained in a time series. For example, sensor data may be captured from one or more sensors over time. Example sensors from which sensor data may be captured over time may include temperature sensors, humidity sensors, pressure sensors, moisture sensors, light sensors, oxygen sensors, weight sensors, position or motion sensors, etc. The captured sensor data may be used, for example, to monitor handling of an asset (e.g., an asset the sensor is coupled to) over time. In some implementations, a smart contract running on blockchain network 1100 may be used to determine if a time series complies with one or more specified conditions.

A captured time series 1000 may be stored in a table, an array, or other appropriate data structure. As noted above, a captured time series 1000 may include a plurality of images (e.g., images captured in a TEE) that are captured over time. The secured representations of blockchain addresses that are captured over time may be embedded in corresponding images. In particular implementations, a captured time series may comprise a video embedded with secured representations of blockchain addresses captured by client device 900.

In some implementations, the captured time series may be embedded in a video recording. To this end, client device 900 may include a camera for capturing the video. Each frame of the video may embed a captured secured representations of location blockchain addresses and asset blockchain address (and, optionally, the secured representation of the user blockchain address). Alternatively, a subset of the frames of the video may embed this information. The embedding of captured secured representations of blockchain addresses in a frame of a video may be performed in substantially the same manner as discussed above with reference to FIGS. 1-6, which describe embedding secured representations of blockchain addresses in an image. In some implementations, each time code of the captured video may be mapped to the secured representations of location blockchain addresses and the asset blockchain address.

Figure 11:
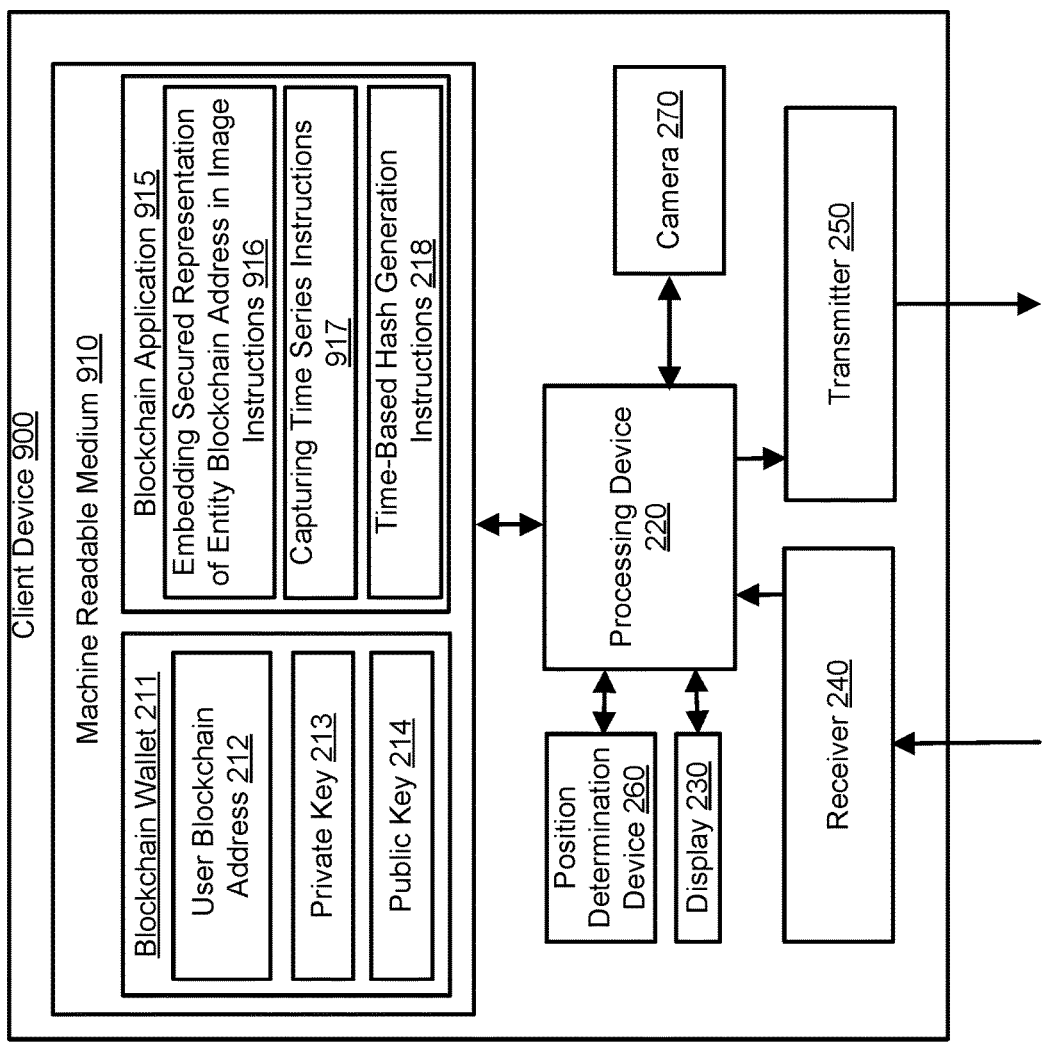
FIG. 11 illustrates an example architecture of components of a client device, in accordance with implementations of the disclosure.

FIG. 11 illustrates an example architecture of components of client device 900, in accordance with implementations of the disclosure. Client device 900 may comprise a machine readable medium 910, processing device 220, display 230, receiver 240, a transmitter 250, a position determination device 260 and a camera 270. The machine readable medium 910 may comprise blockchain wallet 211 and a blockchain application 915.

Blockchain application 915 may include time-based hash generation instructions 218 that, when executed by processing device 220, generate a secured representation of the user blockchain address 212. Blockchain application 915 may also include embedding secured representations of entity blockchain address image instructions 916. Instructions 916, when executed by a processing device 220, may cause client device 900 to embed, in images, captured secured representations of blockchain addresses or other data captured as part of a time series. Blockchain 915 may further include capturing time series instructions 916 that, when executed by a processing device 220, may cause client device 900 to capture a time series associated with the user's handling of an asset, cause the time series data to be written on the blockchain of the blockchain network or written on an external database and referred to by the blockchain, and cause the client device to receive confirmation that time series data has been verified.

Figure 12:
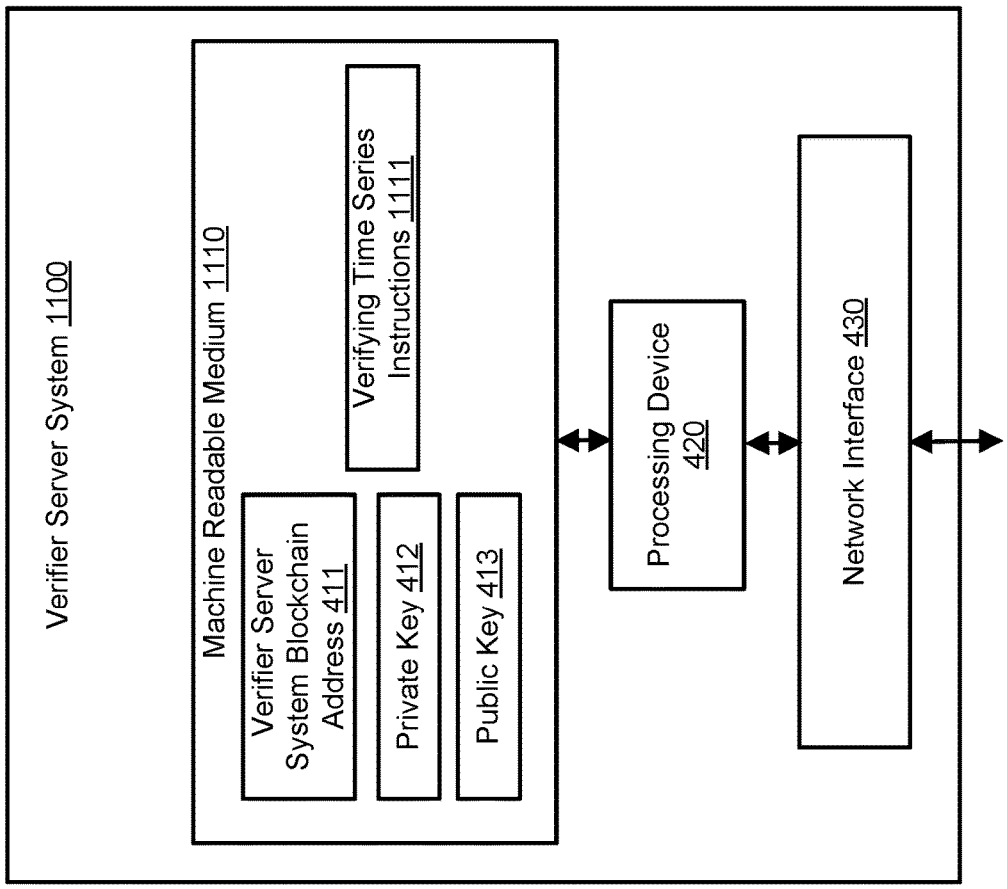
FIG. 12 illustrates an example architecture of components of a verifier, in accordance with implementations of the disclosure.

FIG. 12 illustrates an example architecture of components of verifier 1100, in accordance with implementations of the disclosure. Verifier 1100 may comprise a machine readable medium 1110, a processing device 420, and a network interface 430. Although blockchain address mapping server system 1300 is illustrated in the example of FIG. 9 as being separate from verifier 1100, in some implementations blockchain address mapping server system 1300 may be integrated into verifier 1100. Machine readable medium 1110 may store a blockchain address 411 corresponding to the verifier 2700, and a private key 412 and public key 413 corresponding to the blockchain address 411. Machine readable medium 2710 may also store instructions 1111 that, when executed by a processing 420, verify a time series captured by a client device 900 or a pre-processed time series received from a pre-processing engine either at the edge or the cloud (e.g., from server 1299).

Figure 13:
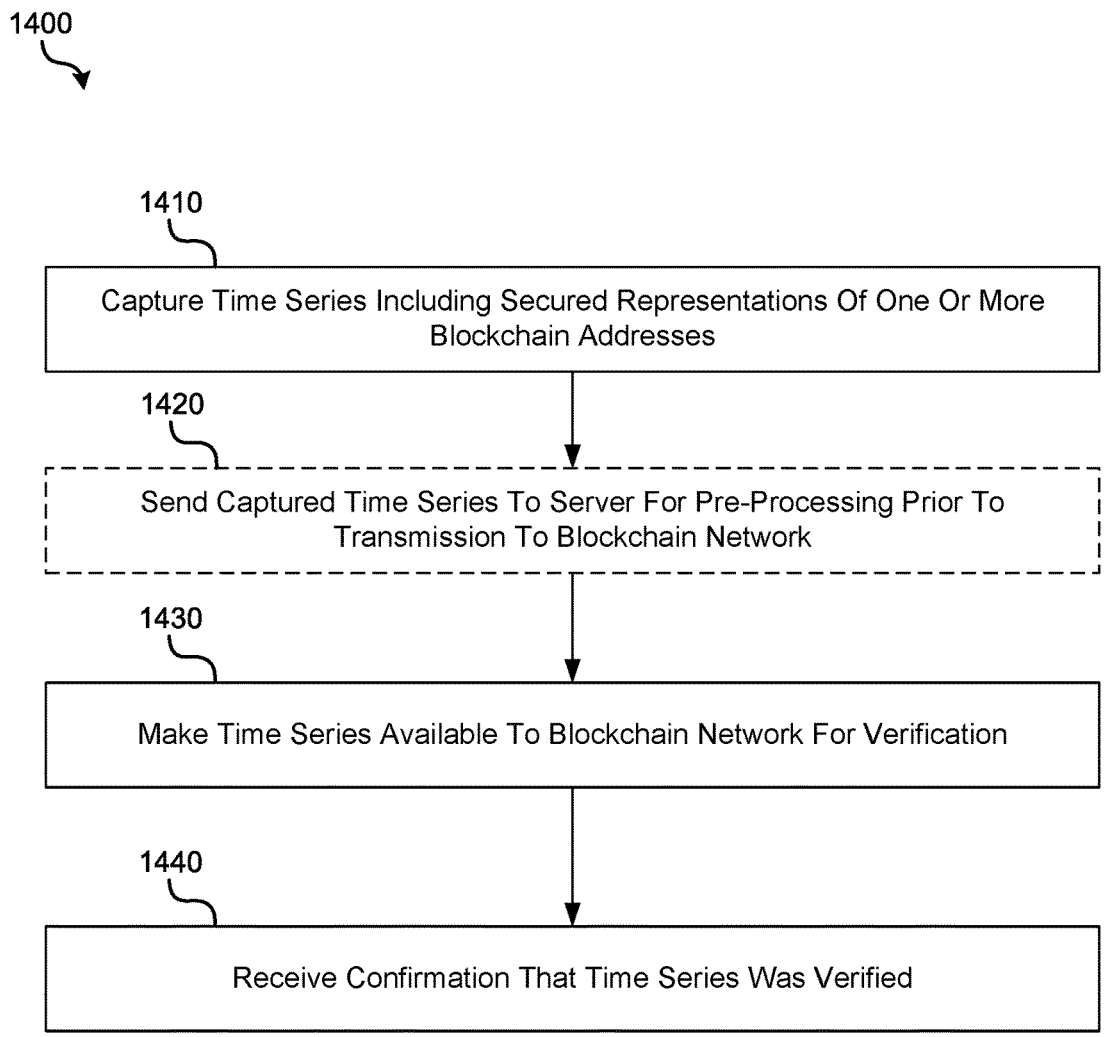
FIG. 13 is an operational flow diagram illustrating an example method that may be implemented by a client device to capture a time series that is verified, in accordance with implementations of the disclosure.

FIG. 13 is an operational flow diagram illustrating an example method 1400 that may be implemented by a client device 900 to capture a time series that is verified, in accordance with implementations of the disclosure. Method 1400 may be implemented by a processing device 220 executing time-based hash generation instructions 218, embedding secured representation of entity blockchain address in image instructions 916, and capturing time series instructions 917.

At operation 1410, client device 900 may capture a time series including, for each time, secured representations of one or more blockchain addresses. Additionally, for each time, the client device 900 may obtain images, video, sensor data, or other information as per the application. For example, client device 900 may capture, at a first time, a secured representation of a blockchain address corresponding to an asset along with images, video, sensor data, or other information as per the application; and capturing, at a second time, after the first time, a second secured representation of a blockchain address corresponding to the asset along with images, video, sensor data, or other information as per the application. In implementations where time series data includes sensor data captured from sensor measurements (e.g., temperature measurements) by sensor devices, the captured sensor data may be to measure a condition of the asset over time and/or a condition of an environment over time.

In implementations where the captured time series data includes images or video, the captured time series may be embedded in the images or video (e.g., as metadata). For example, as discussed above, for each frame of video captured by a camera 270, client device 900 may embed a captured secured representations of blockchain addresses (e.g., asset, location, user, etc.). Alternatively, a subset of the frames of the video may embed this information. In some cases, GPS coordinates or other location data (e.g., collected using position determination device 260) may also be collected and included as metadata for each image or video frame that is part of the time series. The embedding of captured secured representations of blockchain addresses in a frame of a video may be performed in substantially the same manner as discussed above with reference to FIGS. 1-6.

At optional operation 1420, client device 900 may send the captured time series to a server (e.g., server 1299) for pre-processing prior to the time series being transmitted to the blockchain network. The time series data may be pre-processed in a TEE environment. In some implementations, client device 900 may dynamically stream time series data to server 1299 as it is captured. For example, client device 900 may maintain a cache of captured time series data. In other implementations, client device 900 may capture all time series data and then make it available to server 1299 for pre-processing.

At operation 1430, the captured time series data 1000 (or pre-processed time series data) is made available to the blockchain network 1200 for verification. For example, client device 900 may transmit the time series data as a transaction to be written on the blockchain of blockchain network 1200. In implementations where pre-processed time series data is made available, the client device 900 may instruct the server 1299 to make the data available. Alternatively, client device 900 may transmit the time series data off-chain for storage on an external database and to be referred to by the blockchain. In some implementations, the time series data may be transmitted to a verifier 1100 to be verified and written on the blockchain or written on an external database with a blockchain reference to the stored time series data. In some cases, some of the verified time series data may also be run against a smart contract deployed on the blockchain network 1200.

In some implementations, during verification, client device 900 may engage in an interactive proving mechanism with verifier 1100. In implementations, interactive proving may be done after an entire time series is captured. Alternatively, in other implementations, interactive proving may be done after capturing different segments of a time series (e.g., after times T1-T3, after times T4-T6, and after times T7-TN). During the interactive proving mechanism, device 900 may solve some challenge appropriate for the business scenario to submit a claim associated with the time series 1000 to the verifier 900. In other implementations, the interactive proving mechanism may be skipped (e.g., if the level of confidence and security in the captured time series is by itself sufficient).

After the time series is verified on blockchain network 1200, at operation 1040, the client device 900 may receive a confirmation message from the blockchain network 1200 that the times series has been verified. The confirmation may be displayed on a display 230 of client device 900. In some implementations, the client device 900 may receive a reference (e.g., blockchain transaction ID) to an attestation (e.g., a distributed attestation stored on-chain or an attestation stored off-chain) that may be reused.

Figure 14:
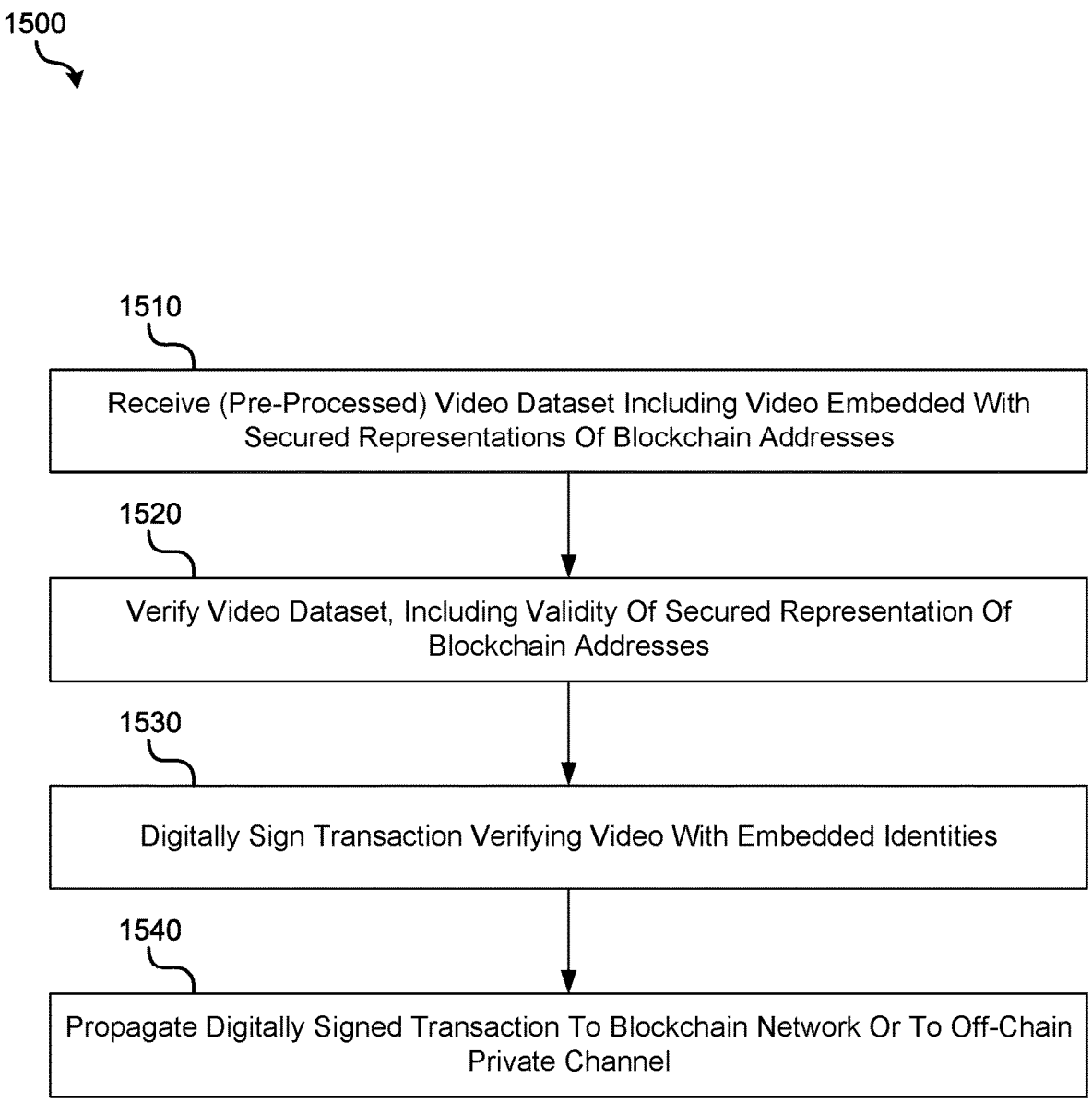
FIG. 14 is an operational flow diagram illustrating an example method that may be implemented by a verifier to verify a video dataset including video embedded with secured representations of blockchain addresses, and to create an attestation on that blockchain attests to the veracity of the video and embedded identities, in accordance with implementations of the disclosure.

FIG. 14 is an operational flow diagram illustrating an example method 1500 that may be implemented by a verifier 1100 to verify a video dataset including video embedded with secured representations of blockchain addresses, and to create an attestation on that blockchain attests to the veracity of the video and embedded identities, in accordance with implementations of the disclosure. Method 1500 may be implemented by a processing device 420 executing verifying time series instructions 1111. It should be appreciate that method 1500 illustrates one particular example of time series verification that may be performed by a verifier 1100, and that in other implementations, verifier 1100 may verify other types of time series (e.g., time series that do not include video or images, but include sensor data).

At operation 1510, the verifier 1100 receives a video dataset including video embedded with secured representations of blockchain addresses. For example, frames of the video may be embedded with entity blockchain addresses, location blockchain addresses, GPS coordinates, and other data. In some implementations, the received video dataset may be pre-processed by a pre-processing server 1299.

At operation 1520, the verifier 1100 verifies the validity of the video dataset, including the embedded secured representations of blockchain addresses. In particular, verifier 1100 may query a blockchain address mapping server system 1300 to perform this verification. As illustrated, blockchain address mapping server system 1300 may include a blockchain address database 1301 of blockchain addresses (e.g., entity blockchain addresses that were registered to entity beacon devices 100 during provisioning, location blockchain addresses that were registered to location beacon devices 500 during provisioning, user blockchain addresses associated with a client device 900, etc.), and time-based hash generation instructions 1302 that may generate a secured representation of a blockchain addresses. In particular, time-based hash generation instructions 1302 may apply the same time-based hashing algorithm to a blockchain address as time-based hash generation instructions contained in a entity beacon device 100, location beacon device 500, and/or client device 900 to generate the same secured representation of a blockchain address. As such, verifier may query a blockchain address mapping server system 1300 to validate (e.g., map secured representations of blockchain addresses to cleartext) the identity of the location, user, entity, or other thing for each time of the time series.

In addition to validating the existence of blockchain addresses associated with the one or more secured representations of blockchain addresses, at operation 1520, computer vision (e.g., including object recognition and/or identification techniques) and/or other associated technologies may be applied to every video frame or a subset of the video frames to confirm that all embedded secured representations of entity blockchain addresses are associated with entities that do in fact appear in the captured image. To this end, blockchain address mapping server system 1300 or some other server system may be queried by verifier 11000 to determine that the association between a captured video frame and embedded secured representations of blockchain addresses are correct.

At operation 1530, verifier 1100 may digitally sign an attestation transaction verifying the video and embedded identities of the video. Verifier 1100 may sign the transaction using a private key 412 associated with its blockchain address. At operation 1540, verifier 400 may propagate the digitally signed attestation transaction to blockchain network 1200 (e.g., to create a distributed attestation transaction on the blockchain) or to private channels as approved earlier for future usage by the client.

As such, once the verification process is complete, the verifier 1100 may either i) store a video with embedded TOTAs and its attestation into a blockchain, ii) store the video in an off-chain database and refer to it in an attestation made on the blockchain, or iii) store the video off-chain and send the attestation over a private channel to a group of participants. In the third variant, the verifier 1100 may advertise a reference to the off-chain attestation on to the blockchain to improve privacy and secrecy. As should be appreciated, these variations may depend on privacy requirements and the business use case. The created attestation may help prove verifiable claims of events happening over a period of time with the participants and locations they traversed during that period.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

In this document, a "server system" may refer to a system of one or more servers.

As described herein, client devices, server systems, beacon devices, asset tags, and sensor devices may implement some or all of their components within a trusted execution environment.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
    one or more image capturing devices;
    a processor; and a non-transitory computer readable medium having executable instructions stored thereon, that, when executed by a processor, performs operations of:
   using the one or more image capturing devices to capture a plurality of images at a respective plurality of times, wherein two entities are captured in each of the plurality of images; and
   for each of the plurality of images captured at each of the respective plurality of times, embedding a secured representation of a distributed ledger address in the image for each of the two entities, wherein the secured representation of the distributed ledger address for each entity is visually embedded in each image such that the secured representation appears with the corresponding entity in each image.

2. The system of claim 1, wherein the plurality of images are captured to track the two entities over time.

3. The system of claim 2, wherein the instructions, when executed by the processor, further perform operations of: receiving a beacon broadcast by a beacon device of one entity of the two entities appearing in at least one of the plurality of images, wherein the received beacon comprises the secured representation of the distributed ledger address of the one entity appearing in the at least one of the plurality of images.

4. The system of claim 2, wherein the plurality of images are video frames of a video.

5. The system of claim 4, wherein the instructions, when executed by the processor, further perform operations of:
   transmitting the video with the embedded secured representations of distributed ledger addresses to a server of a distributed ledger network for verification; and
   receiving confirmation from the server that the video with the embedded secured representations of distributed ledger addresses was verified.

6. The system of claim 1, wherein the instructions, when executed by the processor, further perform operations of:
   generating a secured representation of a distributed ledger address of a user of one of the one or more image capturing devices; and
   embedding the secured representation of the distributed ledger address of the user of the device in at least one of the plurality of images.

7. A method, comprising:
   capturing, at one or more devices, a time series dataset, the time series dataset comprising: for each time of a plurality of times, two secured representations of a distributed ledger address of two entities, each secured representation corresponding to one entity out of the two entities obtained by one of the one or more devices;
   for each entity of the two entities, embedding an immutable identity of things in a video associated with the time series data, each immutable identity of things visibly appearing in the video and including the secured representation of a distributed ledger address of the respective entity such that each immutable identify of things appears next to the respective entity to which it corresponds;
   using the one or more devices to make the time series dataset available to a distributed ledger network for verification; and
   receiving confirmation from the distributed ledger network that the time series dataset was verified, wherein the captured time series dataset is to track the entities over the plurality of times.

8. The method of claim 7, further comprising: transmitting the captured time series dataset from the one or more devices to a server for pre-processing prior to making the time series available to the distributed ledger network for verification, wherein pre-processing of the time series dataset reduces a size of the time series dataset.

9. The method of claim 7, wherein using the one or more devices to make the time series dataset available to the distributed ledger network for verification, comprises:
   transmitting the time series data as a transaction to be written on a distributed ledger of the distributed ledger network.

10. The method of claim 7, wherein using one or more devices to make the time series dataset available to the distributed ledger network for verification, comprises:
   transmitting the time series data off-chain for storage on an external database referred to by a distributed ledger of the distributed ledger network.

11. The method of claim 7, further comprising:
   capturing the video at one of the one or more devices, wherein the video is captured at the plurality of times; and
   embedding the secured representations of the distributed ledger address in the video.

12. The method of claim 7, wherein capturing the time series dataset comprises, for each of the plurality of times:
   receiving, at one of the one or more devices, a beacon comprising a secured representation of a distributed ledger address corresponding to the entity, wherein the entity is an asset; and
   receiving sensor data from a sensor device, wherein the sensor device measures a condition of the asset or an environment of the asset.

13. The method of claim 12, wherein the secured representation of the distributed ledger address captured at each time of the time series is a time-based one time advertisement.

14. A server system, comprising:
   a processor; and
   a non-transitory computer readable medium having executable instructions stored thereon, that, when executed by the processor, performs operations of:
      receiving a time series dataset, the time series dataset comprising for each of a plurality of times, two secured representations of corresponding distributed ledger addresses;
      for each secured representation of the two secured representations, embedding an immutable identity of things in a video associated with the time series data, each immutable identity of things visibly appearing in the video and including the secured representation of a distributed ledger address of a respective entity;
      verifying the time series dataset based on at least one of the two embedded immutable identity of things, wherein verifying the time series dataset comprises verifying the validity of at least one of the two secured representation of the distributed ledger address for each of the plurality of times; and
      digitally signing a transaction attesting to the validity of the time series dataset.

15. The server system of claim 14, wherein the instructions, when executed by the processor, further perform an operation of: propagating the digitally signed transaction to a distributed ledger network to be written to a distributed ledger of the distributed ledger network.

16. The server system of claim 14, wherein the instructions, when executed by the processor, further perform an operation of: propagating the digitally signed transaction off-chain.

17. The server system of claim 14, wherein the time series dataset comprises the video captured at the plurality of times, wherein the secured representation of the distributed ledger address of each of the plurality of times is embedded in the video, wherein verifying the time series dataset comprises verifying the video.

18. The server system of claim 17, wherein the digitally signed transaction comprises an off-chain reference to the video.

19. The server system of claim 17, wherein the digitally signed transaction comprises one or more of:
   a secured representation of a distributed ledger address associated with a location where the video was captured; and
   a secured representation of a distributed ledger address of an entity appearing in the video.

20. The server system of claim 14, wherein verifying the validity of the secured representation of the distributed ledger address of each of the plurality of times, comprises:
   querying a distributed ledger address mapping server system that maintains, over time, a mapping between clear versions of distributed ledger addresses and their secured representations.

* * * * *